US010631331B2

(12) United States Patent
Chendamarai Kannan et al.

(10) Patent No.: US 10,631,331 B2
(45) Date of Patent: Apr. 21, 2020

(54) FRAME STRUCTURE SIGNALING FOR MULTEFIRE

(71) Applicant: QUALCOMM Incorporated, San Diego, CA (US)

(72) Inventors: Arumugam Chendamarai Kannan, San Diego, CA (US); Chirag Patel, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 15/492,457

(22) Filed: Apr. 20, 2017

(65) Prior Publication Data

US 2017/0311346 A1   Oct. 26, 2017

Related U.S. Application Data

(60) Provisional application No. 62/326,702, filed on Apr. 22, 2016.

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0044* (2013.01); *H04L 5/0051* (2013.01);
(Continued)

(58) Field of Classification Search
CPC .. H04L 5/0055; H04L 5/0051; H04W 74/006; H04W 72/14; H04W 72/0446; H04W 16/14
(Continued)

(56) References Cited

U.S. PATENT DOCUMENTS

2014/0064216 A1* 3/2014 Agiwal ................. H04L 1/0031
 370/329
2014/0105191 A1* 4/2014 Yang ..................... H04L 1/1867
 370/336
(Continued)

FOREIGN PATENT DOCUMENTS

WO    WO-2015061987 A1    5/2015

OTHER PUBLICATIONS

ISA/EP, International Search Report and Written Opinion of the International Searching Authority, Int'l Application No. PCT/US2017/028905, Jul. 28, 2017, European Patent Office, Rijswijk, NL, 14 pgs.

(Continued)

*Primary Examiner* — Jae Y Lee
*Assistant Examiner* — Jean F Voltaire
(74) *Attorney, Agent, or Firm* — Holland & Hart LLP/Qualcomm Incorporated

(57) ABSTRACT

Methods, systems, and devices for wireless communication are described. A downlink control message type used for triggering uplink transmissions may convey additional information, including timing for uplink transmissions. The type or format of the control channel (e.g., physical downlink control channel (PDCCH) type or format) used to trigger an uplink transmission may also indicate a starting time or a time period, or both for the uplink transmission. In some cases, downlink control information (DCI) may indicate the function of a downlink control message that includes the DCI. Additionally, system information identified in a downlink control message may be used to determine a subframe length which, in some examples, may be used to determine whether or how long to monitor a discovery reference signal (DRS) subframe.

28 Claims, 18 Drawing Sheets

(51) Int. Cl.
*H04W 16/14* (2009.01)
*H04W 72/14* (2009.01)
*H04W 74/08* (2009.01)
*H04W 72/04* (2009.01)

(52) U.S. Cl.
CPC ........... *H04L 5/0055* (2013.01); *H04W 16/14* (2013.01); *H04W 72/14* (2013.01); *H04L 5/0007* (2013.01); *H04W 72/0446* (2013.01); *H04W 72/0453* (2013.01); *H04W 74/0808* (2013.01)

(58) Field of Classification Search
USPC .......................................................... 370/329
See application file for complete search history.

(56) References Cited

U.S. PATENT DOCUMENTS

| | | |
|---|---|---|
| 2016/0036581 A1 | 2/2016 | Yerramalli et al. |
| 2016/0050667 A1* | 2/2016 | Papasakellariou .... H04L 5/0053 370/329 |
| 2016/0127106 A1* | 5/2016 | Nogami ................ H04L 5/0053 370/329 |

OTHER PUBLICATIONS

Qualcomm Incorporated, "PUCCH Design Details," 3GPP TSG RAN WG1 Meeting #84bis, R1-163025, Busan, Korea, Apr. 11-15, 2016, 3 pgs., XP051080469, 3rd Generation Partnership Project.

Qualcomm, "Introducing MulteFire: LTE-Like Performance with Wi-Fi-Like Simplicity", Jun. 11, 2015, 6 pgs., XP055378290. Retrieved from the Internet: URL:https://www.qualcomm.com/news/onq/2015/06/11/introducing-multefire-lte-performance-wi-fi-simplicity [retrieved on Jun. 2, 2017].

* cited by examiner

FRAME STRUCTURE SIGNALING FOR MULTEFIRE

CROSS REFERENCES

The present Application for Patent claims priority to U.S. Provisional Patent Application No. 62/326,702 by Chendamarai Kannan, et al., entitled "FRAME STRUCTURE SIGNALING FOR MULTEFIRE," filed Apr. 22, 2016, assigned to the assignee hereof, and is hereby expressly incorporated by reference herein in its entirety.

BACKGROUND

The following relates generally to wireless communication and more specifically to frame structure signaling for MulteFire.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some systems, including those using unlicensed bands of radio frequency spectrum, a UE's ability to access the wireless medium may depend on use by other devices or overlapping systems. Unlike systems that rely on licensed bands of radio frequency spectrum, precise scheduling may be difficult. Likewise, timing for previously scheduled or otherwise planned transmission may be subject to unexpected or undetectable delays.

SUMMARY

A downlink control message type used to indicate a frame structure, including timing for uplink transmissions, with a system operating on unlicensed or shared bands of radio frequency spectrum. For example, a downlink control message used for triggering uplink transmissions may convey additional information, including timing for uplink transmissions. The type or format of the control channel (e.g., physical downlink control channel (PDCCH) type or format) used to trigger an uplink transmission may also indicate a starting time or a time period, or both for the uplink transmission. In some cases, downlink control information (DCI) may indicate the function of a downlink control message that includes the DCI. Additionally, system information identified in a downlink control message may be used to determine a subframe length which, in some examples, may be used to determine whether or how long to monitor a discovery reference signal (DRS) subframe.

A method of wireless communication is described. The method may include receiving a downlink (DL) control message using a first set of resources of a shared radio frequency spectrum band, identifying DCI of the DL control message, determining a starting time and a time period for an uplink (UL) transmission based on the control channel type of the DL control message, and transmitting an UL message during the time period using the first set of resources or a second set of resources of the shared radio frequency spectrum band.

An apparatus for wireless communication is described. The apparatus may include means for receiving a DL control message using a first set of resources of a shared radio frequency spectrum band, means for identifying a control channel type of the DL control message, means for determining a starting time and a time period for an UL transmission based on the control channel type of the DL control message, and means for transmitting an UL message during the time period using the first set of resources or a second set of resources of the shared radio frequency spectrum band.

A further apparatus is described. The apparatus may include a processor, memory in electronic communication with the processor, and instructions stored in the memory. The instructions may be operable to cause the apparatus to receive a DL control message using a first set of resources of a shared radio frequency spectrum band, identify a control channel type of the DL control message, determine a starting time and a time period for an UL transmission based on the control channel type of the DL control message, and transmit an UL message during the time period using the first set of resources or a second set of resources of the shared radio frequency spectrum band.

A non-transitory computer readable medium for wireless communication is described. The non-transitory computer-readable medium may include instructions to cause a processor to receive a DL control message using a first set of resources of a shared radio frequency spectrum band, identify a control channel type of the DL control message, determine a starting time and a time period for an UL transmission based on the control channel type of the DL control message, and transmit an UL message during the time period using the first set of resources or a second set of resources of the shared radio frequency spectrum band.

In some examples of the method, apparatus, and non-transitory computer-readable medium described above, identifying the control channel type may include determining whether the DL control message is a PDCCH type or an ePDCCH.

Some examples of the method, apparatus, and non-transitory computer-readable medium described above may further include processes, features, means, or instructions for determining a time period for the UL transmission based on one or both of a UE capability and a control channel type. In some examples of the method, apparatus, or non-transitory computer-readable medium described above, the time period may be determined based on a number of control symbols occupied by the DL control message.

In some examples of the method, apparatus, or non-transitory computer-readable medium described above, the UL message may include at least one of a physical uplink control channel (PUCCH) message, a short PUCCH (sPUCCH) message, an enhanced PUCCH (ePUCCH) message, an acknowledgement (ACK) message corresponding to a previous DL transmission, or a physical uplink shared channel (PUSCH) message. Some examples of the method, apparatus, or non-transitory computer-readable medium described above may further include processes, features, means, or instructions for receiving a grant for a PUSCH transmission before receiving the DL control message. In some examples of the method, apparatus, or non-transitory computer-readable medium described above, the DL control message may be a common PDCCH (C-PDCCH).

Another method of for wireless communication is described. The method may include receiving a DL control message using a first set of resources of a shared radio frequency spectrum band, identifying DCI of the DL control message, and determining a function of the DL control message based at least in part on the DCI, where the function of the DL control message comprises at least one of an uplink transmission trigger or a frame structure indication.

Another apparatus for wireless communication is described. The apparatus may include means for receiving a DL control message using a first set of resources of a shared radio frequency spectrum band, means for identifying DCI of the DL control message, and means for determining a function of the DL control message based at least in part on the DCI, where the function of the DL control message comprises at least one of an uplink transmission trigger or a frame structure indication.

Another apparatus for wireless communication is described. The apparatus may include a processor, memory in electronic communication with the processor, and instructions stored in the memory. The instructions may be operable to cause the processor to receive a DL control message using a first set of resources of a shared radio frequency spectrum band, identify DCI of the DL control message, and determine a function of the DL control message based on the DCI, where the function of the DL control message comprises at least one of an uplink transmission trigger or a frame structure indication.

Another non-transitory computer readable medium for wireless communication is described. The non-transitory computer-readable medium may include instructions operable to cause a processor to receive a DL control message using a first set of resources of a shared radio frequency spectrum band, identify DCI of the DL control message, and determine a function of the DL control message based at least in part on the DCI, where the function of the DL control message comprises at least one of an uplink transmission trigger or a frame structure indication.

In some examples, at least one of the uplink transmission trigger or the frame structure indication comprises at least one of a short physical uplink control channel (sPUCCH) trigger, an enhanced PUCCH (ePUCCH) trigger, or a cross-transmission opportunity (TxOP) grant trigger.

Some examples of the methods, apparatus, and non-transitory computer-readable mediums described above may further include processes, features, means, or instructions for identifying a decoding hypothesis associated with a DCI format. Some examples of the method, apparatus, or non-transitory computer-readable medium described above may further include processes, features, means, or instructions for determining whether the DL control message passed a blind decoding check associated with the decoding hypothesis, where the function of the DL control message may be determined based on the determination that the DL control message passed the blind decoding check.

Some examples of the methods, apparatus, and non-transitory computer-readable mediums described above may further include processes, features, means, or instructions for decoding a first portion of the DCI, where determining the function of the DL control message may include interpreting a second portion of the DCI based on the first portion of the DCI.

Some examples of the methods, apparatus, and non-transitory computer-readable mediums described above may further include processes, features, means, or instructions for receiving a cross-TxOP grant, where the function of the DL control message may be a cross-TxOP grant trigger and the cross-TxOP grant is received before the cross-TxOP grant trigger. Some examples of the method, apparatus, or non-transitory computer-readable medium described above may further include processes, features, means, or instructions for transmitting an UL message in response to the cross-TxOP grant and the cross-TxOP grant trigger.

Some examples of the methods, apparatus, and non-transitory computer-readable mediums described above may further include processes, features, means, or instructions for receiving a cross-TxOP configuration indicating a location of the cross-TxOP grant trigger.

In some examples of the methods, apparatus, and non-transitory computer-readable mediums described above, the cross-TxOP grant trigger may include a single bit of the DL control message. In some examples of the methods, apparatus, and non-transitory computer-readable mediums described above, the cross-TxOP grant trigger may include a set of bits of the DL control message corresponding to a set of cross-TxOP grants.

Another method of wireless communication is described. The method may include receiving a system information message during a subframe, determining a duration of a DRS subframe based on the system information message, and monitoring for a DRS for the duration of the DRS subframe.

Another apparatus for wireless communication is described. The apparatus may include means for receiving a system information message during a subframe, means for determining a duration of a DRS subframe based on the system information message, and means for monitoring for a DRS for the duration of the DRS subframe.

Another apparatus is described. The apparatus may include a processor, memory in electronic communication with the processor, and instructions stored in the memory. The instructions may be operable to cause the apparatus to receive a system information message during a subframe, determine a duration of a DRS subframe based on the system information message, and monitor for a DRS for the duration of the DRS subframe.

Another non-transitory computer readable medium for wireless communication is described. The non-transitory computer-readable medium may include instructions to cause a processor to receive a system information message during a subframe, determine a duration of a DRS subframe based on the system information message, and monitor for a DRS for the duration of the DRS subframe.

Another method of wireless communication is described. The method may include identifying a control channel type of a DL control message, transmitting the DL control message using a first set of resources of a shared radio frequency spectrum band, determining a starting time and a time period for an UL transmission based on the control channel type of the DL control message, and receiving an UL message during the time period using the first set of resources or a second set of resources of the shared radio frequency spectrum.

Another apparatus for wireless communication is described. The apparatus may include means for identifying a control channel type of a DL control message, means for transmitting the DL control message using a first set of resources of a shared radio frequency spectrum band, means for determining a starting time and a time period for an UL transmission based on the control channel type of the DL control message, and means for receiving an UL message during the time period using the first set of resources or a second set of resources of the shared radio frequency spectrum.

Another apparatus is described. The apparatus may include a processor, memory in electronic communication with the processor, and instructions stored in the memory. The instructions may be operable to cause the apparatus to identify a control channel type of a DL control message, transmit the DL control message using a first set of resources of a shared radio frequency spectrum band, determine a starting time and a time period for an UL transmission based on the control channel type of the DL control message, and receive an UL message during the time period using the first set of resources or a second set of resources of the shared radio frequency spectrum.

Another non-transitory computer readable medium for wireless communication is described. The non-transitory computer-readable medium may include instructions to cause a processor to identify a control channel type of a DL control message, transmit the DL control message using a first set of resources of a shared radio frequency spectrum band, determine a starting time and a time period for an UL transmission based on the control channel type of the DL control message, and receive an UL message during the time period using the first set of resources or a second set of resources of the shared radio frequency spectrum.

In some examples of the methods, apparatus, and non-transitory computer-readable mediums described above, identifying the control channel type may include determining whether the DL control message is a PDCCH type or an ePDCCH. In some examples of the method, apparatus, or non-transitory computer-readable medium described above, the time period may be determined based on a UE capability. In some examples of the method, apparatus, or non-transitory computer-readable medium described above, the time period may be determined based on a number of control symbols occupied by the DL control message.

In some examples of the methods, apparatus, and non-transitory computer-readable mediums described above, the UL message comprises at least one of a PUCCH message, a sPUCCH message, an ePUCCH message, an ACK message corresponding to a previous DL transmission, or a PUSCH message.

Some examples of the methods, apparatus, and non-transitory computer-readable mediums described above may further include processes, features, means, or instructions for transmitting a grant for a PUSCH transmission before transmitting the DL control message. In some examples of the methods, apparatus, and non-transitory computer-readable mediums described above, the DL control message may be a C-PDCCH.

Another method of for wireless communication is described. The method may include configuring a function of a DL control message, the function of the DL control message comprises at least one of an uplink transmission trigger or a frame structure indication; selecting DCI of the DL control message based on the function of the DL control message; and transmitting the DL control message using a first set of resources of a shared radio frequency spectrum band.

Another apparatus for wireless communication is described. The apparatus may include means for configuring a function of a DL control message, the function of the DL control message comprises at least one of an uplink transmission trigger or a frame structure indication; means for selecting DCI of the DL control message based on the function of the DL control message; and means for transmitting the DL control message using a first set of resources of a shared radio frequency spectrum band.

Another apparatus for wireless communication is described. The apparatus may include a processor, memory in electronic communication with the processor, and instructions stored in the memory. The instructions may be operable to cause the processor to configure a function of a DL control message, where the function of the DL control message comprises at least one of an uplink transmission trigger or a frame structure indication; select DCI of the DL control message based on the function of the DL control message; and transmit the DL control message using a first set of resources of a shared radio frequency spectrum band.

Another non-transitory computer readable medium for wireless communication is described. The non-transitory computer-readable medium may include instructions operable to cause a processor to configure a function of a DL control message, where the function of the DL control message comprises at least one of an uplink transmission trigger or a frame structure indication; select DCI of the DL control message based on the function of the DL control message; and transmit the DL control message using a first set of resources of a shared radio frequency spectrum band.

In some examples, at least one of the uplink transmission trigger or the frame structure indication comprises at least one of a short physical uplink control channel (sPUCCH) trigger, an enhanced PUCCH (ePUCCH) trigger, or a cross-transmission opportunity (TxOP) grant trigger.

Some examples of the methods, apparatus, and non-transitory computer-readable mediums described above may further include processes, features, means, or instructions for transmitting a cross-TxOP grant, where the function of the DL control message may be the cross-TxOP grant trigger and the cross-TxOP grant may be transmitted before the cross-TxOP grant trigger. Some examples of the methods, apparatus, and non-transitory computer-readable mediums described above may further include processes, features, means, or instructions for receiving an UL message in response to the cross-TxOP grant and the cross-TxOP grant trigger.

Some examples of the methods, apparatus, and non-transitory computer-readable mediums described above may further include processes, features, means, or instructions for transmitting a cross-TxOP configuration indicating a location of the cross-TxOP grant trigger. In some examples of the methods, apparatus, and non-transitory computer-readable mediums described above, the cross-TxOP grant trigger may include a single bit of the DL control message. In some examples of the methods, apparatus, and non-transitory computer-readable mediums described above, the cross-TxOP grant trigger may include a set of bits of the DL control message corresponding to a set of cross-TxOP grants.

Another method of wireless communication is described. The method may include identifying a duration of a DRS subframe to be monitored, transmitting an indication of the duration of the DRS subframe in a system information message, and transmitting a DRS for the duration of the DRS subframe.

Another apparatus for wireless communication is described. The apparatus may include means for identifying a duration of a DRS subframe to be monitored, means for transmitting an indication of the duration of the DRS subframe in a system information message, and means for transmitting a DRS for the duration of the DRS subframe.

Another apparatus is described. The apparatus may include a processor, memory in electronic communication with the processor, and instructions stored in the memory. The instructions may be operable to cause the apparatus to identify a duration of a DRS subframe to be monitored, transmit an indication of the duration of the DRS subframe in a system information message, and transmit a DRS for the duration of the DRS subframe.

Another non-transitory computer readable medium for wireless communication is described. The non-transitory computer-readable medium may include instructions to cause a processor to identify a duration of a DRS subframe to be monitored, transmit an indication of the duration of the DRS subframe in a system information message, and transmit a DRS for the duration of the DRS subframe.

DETAILED DESCRIPTION

Figure 1:
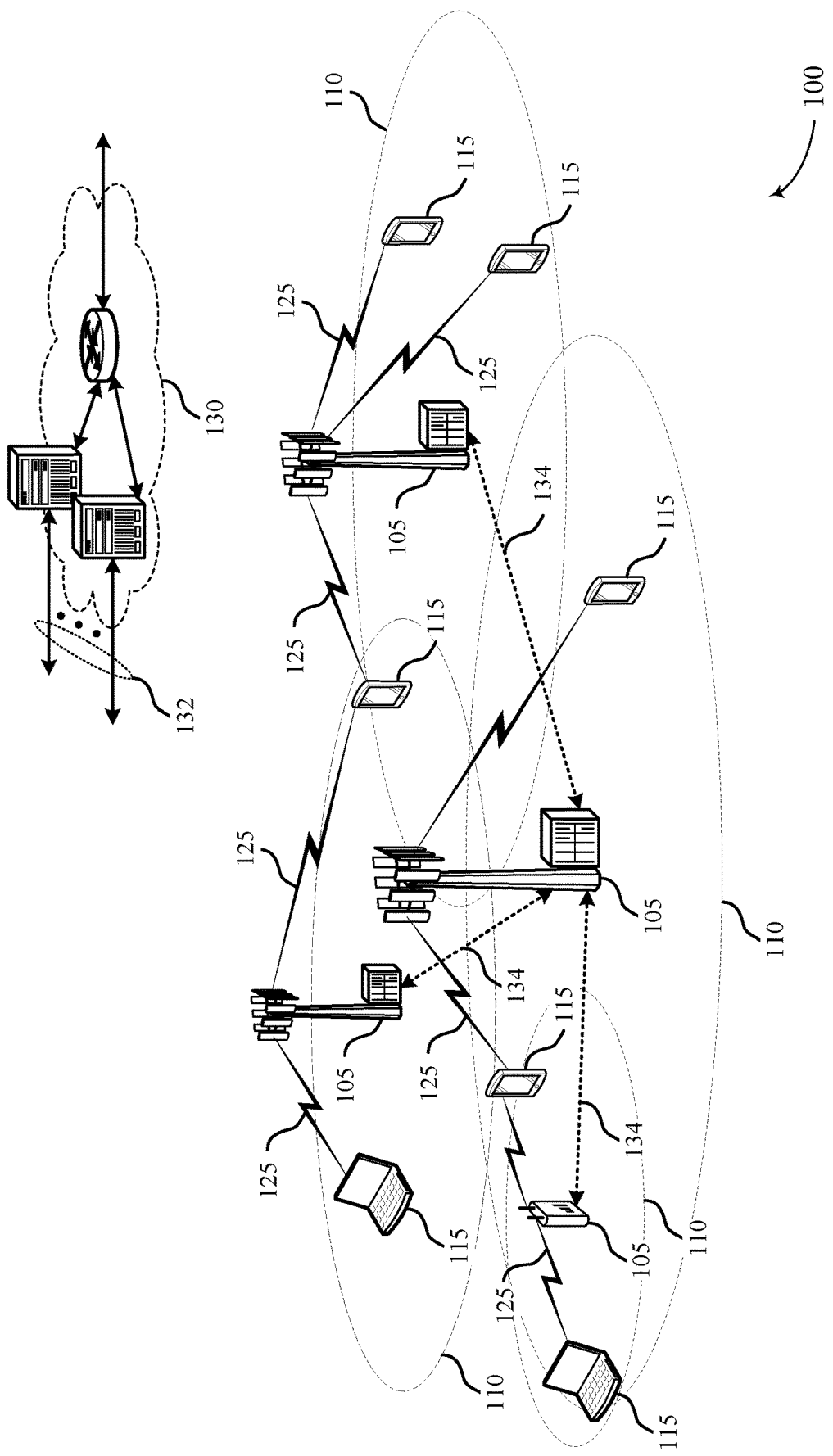
FIG. 1 illustrates an example of a wireless communications system that supports frame structure signaling for MulteFire in accordance with aspects of the present disclosure.

A downlink control channel may be used to indicate a frame structure to a user equipment (UE), which may allow the UE to determine when to transmit an uplink message using resources assigned in another (e.g., prior) grant. For example, a UE may receive an uplink grant during one transmission opportunity (TxOP), and that grant may assign resources in a subsequent TxOP. This may be referred to as a cross-TxOP grant. The subsequent TxOP may not immediately follow the TxOP in which the grant was received. For instance, the subsequent TxOP may be separated in time from the prior TxOP because the UE and an associated base station may be communicating in a shared spectrum within which they compete with other devices for resources. The subsequent TxOP may also have a different structure (e.g., a different combination or order of downlink and uplink portions) than the TxOP in which the grant was received. So a grant received during one TxOP may assign resources of a subsequent TxOP, and a subsequent control message received during the subsequent TxOP may indicate a frame structure of the subsequent TxOP and may trigger the UE to transmit on resources of the subsequent TxOP assigned by the previously received grant. The subsequent control message may be a message common to several UEs.

Characteristics of a downlink control channel, such as a physical downlink control channel (PDCCH) type or PDCCH format may indicate frame structure information. Whether a PDCCH or enhanced PDCCH (ePDCCH) is used as a common control channel may, for example indicate a starting time or a time period for an uplink transmission. In some cases, aspects of downlink control information (DCI) conveyed in a common control channel may indicate an intended function of the common control channel, including whether and what type of frame structure information may be indicated by the common control channel.

In some examples, a time between a UE receiving downlink transmissions and the UE beginning uplink transmissions may depend on the frame structure, in addition to, for example, UE capabilities. As such, a base station may signal to a UE a frame structure and timing corresponding to the minimum time such that the UE may decode the control channel and determine whether an upcoming subframe is, for example, an uplink, downlink, or special subframe, in time to prepare accordingly (e.g., to transmit a cross-TxOP grant on an uplink subframe, to transmit an acknowledgement (ACK)/negative acknowledgement (NACK) on a special subframe, etc.). In some cases, the timing of a common control channel may indicate frame structure information. For example, a UE may determine a minimum amount of time to be used between a subframe carrying a common physical downlink control channel (C-PDCCH) trigger and a next transmission intended for the UE. The UE may determine this minimum amount of time based on factors including, for example, UE capability, the type of PDCCH, and the number of control symbols used by PDCCH.

As mentioned above, a C-PDCCH may have multiple formats which may correspond to different functions. That is, a C-PDCCH may have different DCI formats, radio network temporary identifiers (RNTIs), etc., that are associated with different functions (e.g., short physical uplink control channel (PUCCH) (sPUCCH)/enhanced PUCCH (ePUCCH) triggering, frame structure signaling, etc.). In some cases, a C-PDCCH may trigger previously issued cross-TxOP grants. In addition, a format of a PDCCH may be used to determine the length of a subframe. Knowledge of the length of the subframe may improve decoding reliability.

Aspects of the disclosure introduced above are described below in the context of a wireless communications system. Examples of wireless systems and process flows supporting frame structure signaling for MulteFire are then described. Aspects of the disclosure are further illustrated by and described with reference to apparatus diagrams, system diagrams, and flowcharts that relate to frame structure signaling for MulteFire.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. For example, wireless communications system 100 may include an LTE/LTE-A network, a MulteFire network, a neutral host small cell network, or the like, operating with overlapping coverage areas.

A MulteFire network may include access points (APs) and/or base stations 105 communicating in an unlicensed radio frequency spectrum band, e.g., without a licensed frequency anchor carrier. For example, the MulteFire network may operate without an anchor carrier in the licensed spectrum. Wireless communications system 100 may support discovery reference signal (DRS) transmission and decoding techniques which may, e.g., increase the efficiency of MulteFire communications within system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be MulteFire base stations 105, which may have limited or non-ideal backhaul links 134 with other base stations 105.

In some cases, a UE 115 or base station 105 may operate in a shared or unlicensed radio frequency spectrum band. These devices may perform a clear channel assessment (CCA) prior to communicating in order to determine whether the channel is available. A CCA may include an energy detection procedure to determine whether there are any other active transmissions. For example, the device may infer that a change in a reference signal strength indication (RSSI) of a power meter indicates that a channel is occupied. Specifically, signal power that is concentrated in a certain bandwidth and exceeds a predetermined noise floor may indicate that another wireless transmitter may be using the channel. A CCA may also include detection of specific sequences that indicate use of the channel. For example, another device may transmit a specific preamble prior to transmitting a data sequence.

UEs 115 and base stations 105 operating in licensed or unlicensed spectrum may transmit DRS to convey information for identifying and establishing a radio connection. For example, DRS may include primary and secondary synchronization signals to enable a UE 115 to identify the timing and frequency range of a cell. After completing initial cell synchronization, a UE 115 may decode the master information block (MIB). The MIB may be transmitted on physical broadcast channel (PBCH) and may utilize the first 4 OFDMA symbols of the second slot of the first subframe of each radio frame. It may use the middle 6 resource block (RBs) (72 subcarriers) in the frequency domain. The MIB carries a few important pieces of information for UE initial access, including: DL channel bandwidth in term of RBs, physical hybrid automatic repeat request (HARM) indicator channel (PHICH) configuration (duration and resource assignment), and system frame number (SFN). A new MIB may be broadcast every fourth radio frame (SFN mod 4=0) at and rebroadcast every frame (10 ms). Each repetition may be scrambled with a different scrambling code.

After reading a MIB (either a new version or a copy), the UE 115 may try different phases of a scrambling code until it gets a successful cyclic redundancy check (CRC) check. The phase of the scrambling code (0, 1, 2, or 3) may enable the UE 115 to identify which of the four repetitions has been received. Thus, the UE 115 may determine the current SFN by reading the SFN in the decoded transmission and adding the scrambling code phase.

After receiving the MIB, a UE may receive one or more system information block (SIBs). Different SIBs may be defined according to the type of system information (SI) conveyed and they may be defined for licensed frequency operation or unlicensed frequency operation, or both. In some examples, certain SIBs may be used by UEs 115 operating under a MulteFire scheme within system 100, while other SIBs may be used by UEs 115 operating on licensed frequencies.

For example, a UE 115 operating on licensed frequencies may decode SIB1 and SIB2, in addition to the MIB, prior to accessing the network. A new SIB1 may be transmitted in the fifth subframe of every eighth frame (SFN mod 8=0) and rebroadcast every other frame (20 ms). SIB1 includes access information, including cell identity (CID) information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256, or 512 radio frames. In some cases, the periodicity and configuration of MIB and SIBs may be different for cells operating in licensed and unlicensed spectrum.

For UEs 115 operating on unlicensed frequencies, including those operating on MulteFire portions of system 100, the UE 115 may decode an enhanced SIB (eSIB). The eSIB may be broadcast (e.g., on PBCH) and may include system information equivalent to some fields or information included in other SIBs. For example, the eSIB may include information that may also be conveyed in SIB1 and SIB2 in licensed frequency operation, as described above. In some cases, the eSIB may include an indication of subframe configurations including, for example, whether certain subframes are multimedia broadcast single frequency network (MBSFN) subframes. The eSIB may support unlicensed operation because it may quickly provide information (e.g., frame-type or subframe configuration) to a UE 115 after cell acquisition.

As discussed above, UEs 115 operating in a shared radio frequency spectrum band may be unable to readily determine a frame structure used in the system without some indication of timing and the like. Time intervals in system 100 may be expressed in multiples of a basic time unit (e.g., the sampling period, $T_s=1/30,720,000$ seconds). Time resources may be organized according to radio frames of length of 10 ms ($T_f=307200\ T_s$), which may be identified by an SFN ranging from 0 to 1023.

Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). A resource element consists of one symbol period and one subcarrier (a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements.

Excluding the cyclic prefix, each symbol may contain 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs). A subframe may have different structures depending on the type and direction of information to be transmitted. A subframe type may be an uplink (UL) subframe, a downlink (DL) subframe, or a special subframe. Special subframes may facilitate a switch from downlink to uplink transmission. Further the structure of a subframe may vary in terms of length.

Other frame structures may also be employed in system 100. In some cases, system 100 may be organized by TxOPs, which may be organized according to the frame structure described above and which a may be separated by periods of time during which the wireless medium may be unavailable for devices (e.g., UEs 115 or base stations (or eNBs) 105) within system 100.

Frame structure signaling, as describe herein, may inform a UE 115 of a subframe structure prior to communications. The frame structure signaling may be broadcast to one or more UEs 115 via a common control channel (e.g., using a C-PDCCH). The signaling may include an indication of both the subframe type and the subframe length. In some cases, a C-PDCCH may be used for sPUCCH triggering, frame structure signaling, ePUCCH triggering, and/or cross-transmission opportunity (cross-TXOP) grant triggering (e.g., for each UE or a subset of UEs).

The timeline of decoding of the control channel indicating the frame structure may depend on the structure of the control channel itself. That is, the type of PDCCH and number of OFDM symbols used for PDCCH may determine the timeline for processing (e.g., decoding). For example, downlink control signaling indicating frame structure may include a PDCCH or an enhanced PDCCH (ePDCCH). PDCCH may occupy 1-3 OFDM symbols. Control channels of this length may be decoded within the same subframe during which the control channel was transmitted (e.g., a UE 115 may decode a PDCCH during the remaining symbols of the subframe it was transmitted in). Additionally or alternatively, an E-PDCCH may occupy up to 14 OFDM symbols. The decoding of E-PDCCH may extend beyond the subframe boundary and into the next subframe.

UEs 115 may complete PDCCH decoding to prepare for subsequent transmissions. The UE 115 may decode the PDCCH before a certain time to ascertain whether an upcoming subframe is an uplink, downlink, or special subframe in order to behave accordingly at the appropriate time (e.g., the next subframe). For example, if the PDCCH indicates the subsequent subframe is an uplink subframe for transmission, the UE 115 may decode the PDCCH with enough time remaining in the subframe to prepare for uplink transmission at the beginning of the following subframe. These transmissions may be triggered by the C-PDCCH. For example, the UE 115 may transmit on an uplink subframe using resources allocated by a cross-TXOP grant, and/or an acknowledgement (ACK)/negative acknowledgement (NACK) on a special subframe.

PUCCH may be used for transmitting UL ACKs, scheduling requests (SRs) and channel quality index (CQI) and other UL control information. A PUCCH may be mapped to a control channel defined by a code and two consecutive resource blocks. UL control signaling may depend on the presence of timing synchronization for a cell. PUCCH resources for SR and CQI reporting may be assigned (and revoked) through radio resource control (RRC) signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Wireless communications system 100 may support UL transmission using an ePUCCH. An ePUCCH may include resources from portions of several resource blocks. For example, ePUCCH may be interleaved with other transmissions within resource blocks. In some cases, ePUCCH transmissions from several UEs 115 may be interleaved within a set of resource blocks.

Wireless communications system 100 may also support a shortened control channel, which may be referred to as a short-duration PUCCH or sPUCCH. An sPUCCH may use a similar interleave structure as ePUCCH but may include resources of a smaller number of resource blocks. For example, sPUCCH may use resources of four or fewer OFDM symbols. In some examples, sPUCCH may be transmitted using a special subframe (e.g., a subframe that allows switching from downlink to uplink scheduling, or vice versa), and a common PDCCH may be used by base station 105 to dynamically indicate the presence of the special subframe to a UE 115. The ability of UE 115 to transmit a control message using the shortened control channel may be indicated by the presence of a downlink message (e.g., a downlink grant, etc.) from base station 105. In some cases, the control message may be transmitted in unlicensed spectrum using a channel that includes multiple sub-bands, such as an 80 MHz channel of four 20 MHz bands.

Figure 2:
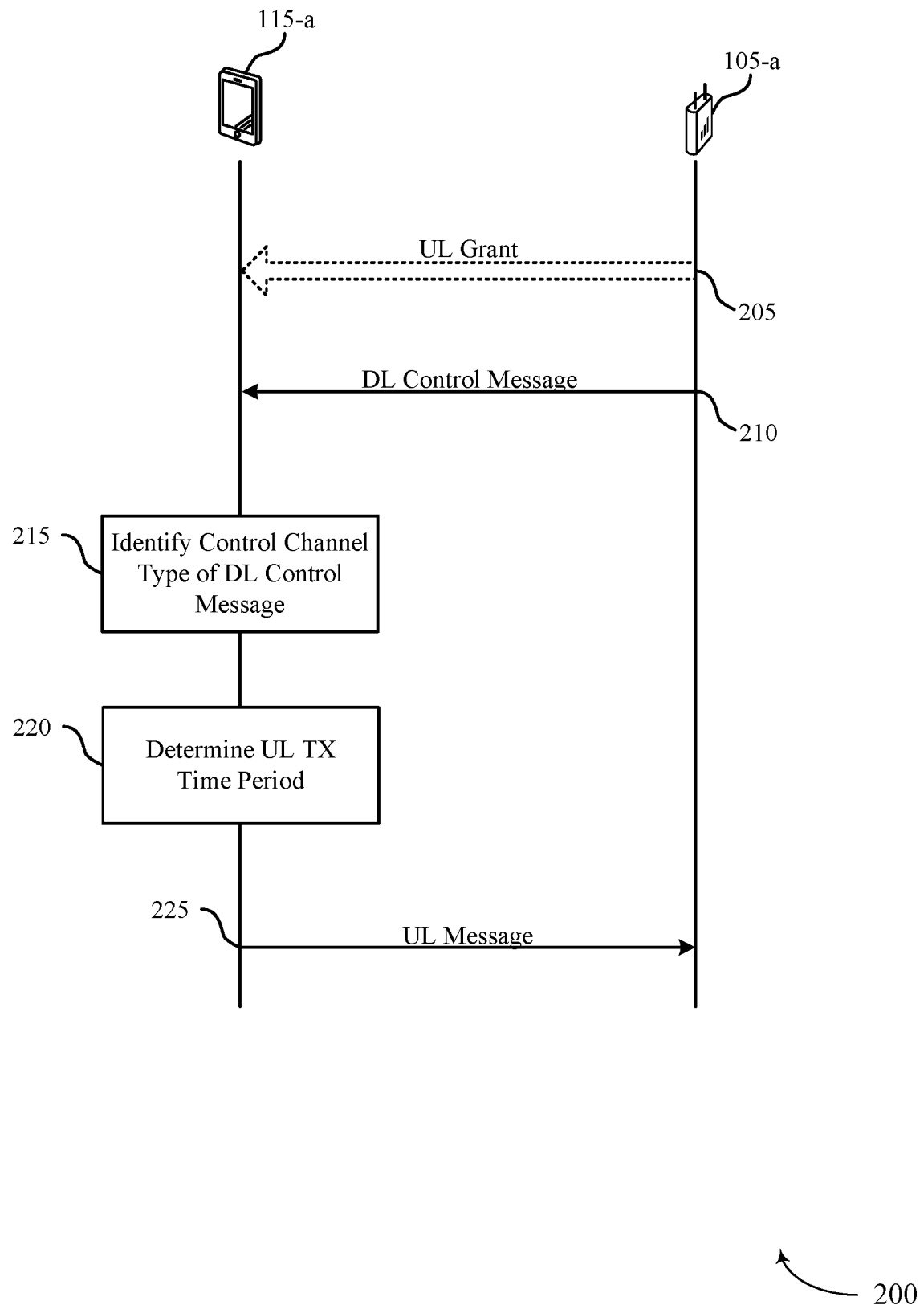
FIG. 2 illustrates an example of a process flow in a system that supports frame structure signaling for MulteFire in accordance with aspects of the present disclosure.

FIG. 2 illustrates an example of a process flow 200 for frame structure signaling for MulteFire in accordance with various aspects of the present disclosure. Process flow 200 may include base station 105-a and UE 115-a, which may be examples of the corresponding devices as described with reference to FIG. 1. Process flow 200 represents an example in which a type of control message (i.e., PDCCH vs ePDCCH) and other parameters may be used to indicate the timing of a subsequent UL transmission.

That is, a minimum time may be used between a subframe carrying a C-PDCCH trigger and the intended UE 115 transmission, and this minimum time may depend on several factors. For example, UE capability, the type of PDCCH, and the number of control symbols used by PDCCH may determine the amount of time between the C-PDCCH trigger and UE transmission. The UE capability may include how fast the UE can decode a PDCCH, the turnaround time for decoding to transmission, etc. In some cases, the UE 115 may indicate this information to the base station 105.

At 205, base station 105-a may transmit a grant to UE 115-a for an UL transmission. The UL transmission may refer to a sPUCCH, a physical uplink shared channel (PUSCH), and/or an ePUCCH transmission. A sPUCCH may carry ACK/NACKs in response to DCI. A PUSCH and/or an ePUCCH may correspond to a previously issued grant in the PDCCH. As mentioned above, the ePUCCH may extend a regular PUCCH to an interlaced structure (e.g., increase the PUCCH from 1 resource block to 10 resource blocks). The larger resource block channel of the ePUCCH may allow for larger uplink payloads. An sPUCCH may be similar in nature to a regular PUCCH with a reduced symbol duration. For example, a sPUCCH may last 4 symbols (e.g., reduced from 14 symbols of a regular PUCCH), with 2 pilot symbols and 2 OFDM symbols for control information. An sPUCCH may be used in small payload scenarios where there are few bits to transmit.

At 210, UE 115-a may receive a downlink control message (e.g., C-PDCCH) transmitted by base station 105-a. The downlink control message may be a C-PDCCH, a PDCCH, or an ePDCCH. A C-PDCCH may be common to many UEs 115. C-PDCCH may occupy a portion of a subframe (e.g., the C-PDCCH may occupy some but not all time resources of a subframe) or the C-PDCCH may take up an entire subframe (e.g., the ePDCCH may be frequency division multiplexed with other channels and may occupy many or all time resources of a subframe). PDCCH or ePDCCH may contain control information for a specific UE. An ePDCCH may take up an entire subframe (e.g., the ePDCCH may be frequency division multiplexed with other channels and may occupy many or all time resources of a subframe) and may not allow for decoding and turnaround within the subframe the ePDCCH was sent. A PDCCH (i.e., a regular PDCCH or non-ePDCCH) may end before the end of the subframe, and may allow for decoding and turnaround to occur within the subframe during which it was sent. The number of control symbols used by PDCCH may refer to the number of OFDM symbols the C-PDCCH, PDCCH, or ePDCCH occupies. The number of PDCCH symbols compared to the total number of symbols in the subframe may have implications on decoding and turnaround.

At 215, UE 115-a may identify a control channel type of the downlink control message received at 210. The UE 115-a may determine whether the downlink control message is a C-PDCCH, a PDCCH or an ePDCCH. In some cases, the control channel type includes a duplexing configuration of the downlink control message. For example, the control channel type may include an indication of whether the system is configured for TDD or FDD, or whether the system employs a particular frequency hopping configuration.

At 220, UE 115-a may determine a time period for an uplink transmission based on the control channel type identified at 215. In some examples, the time period may be determined based on UE 115-a capabilities such as decoding speed, turnaround time, etc. In other examples, the time period may be determined based on a number of control symbols occupied by the downlink control message. The time period may follow the minimum time between a subframe carrying a C-PDCCH trigger and the intended UE transmission as described above.

At 225, UE 115-a may transmit an uplink message during the time period determined at 220. The uplink message may include a PUCCH message, a sPUCCH message, an ePUCCH message, an ACK message corresponding to a previous DL transmission, and/or a PUSCH message.

Figure 3:
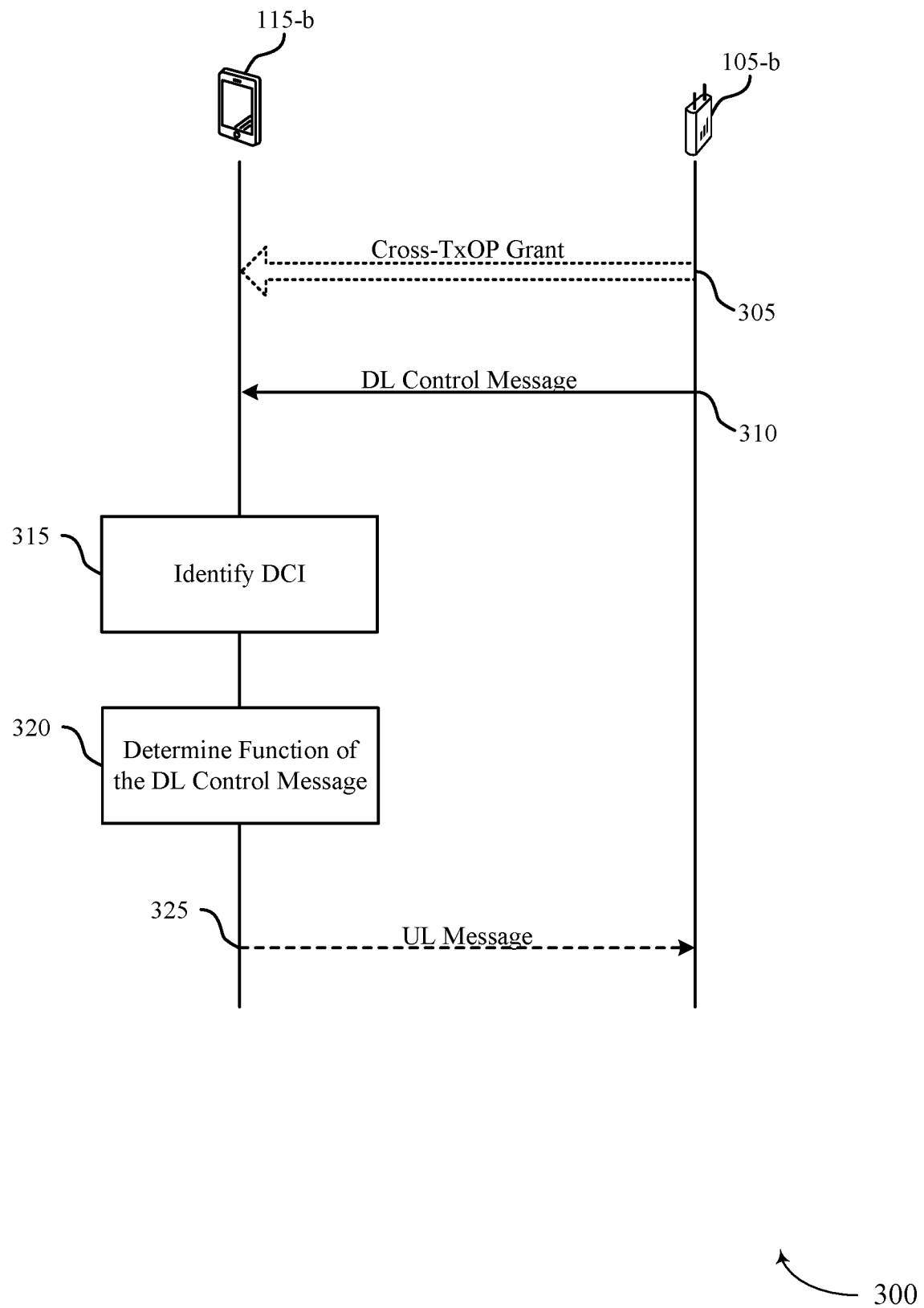
FIG. 3 illustrates an example of a process flow in a system that supports frame structure signaling for MulteFire in accordance with aspects of the present disclosure.

FIG. 3 illustrates an example of a process flow 300 for frame structure signaling for MulteFire in accordance with various aspects of the present disclosure. Process flow 300 may include base station 105-b and UE 115-b, which may be examples of the corresponding devices as described with reference to FIG. 1. Process flow 300 represents an example in which a format of (or a number of bits of) a DCI message indicate the function of a downlink control message.

A C-PDCCH may have multiple formats in order to support different functionalities. That is, a C-PDCCH may be configured with a different DCI format, or be encoded based on different radio network temporary identifier (RNTI), to indicate different functions (e.g., sPUCCH/ePUCCH triggering, frame structure signaling, etc.).

A C-PDCCH may trigger previously received and processed cross-TxOP grants. The triggering of a cross-TxOP grant may include a single bit to provide an enable/disable signal for a UE and/or a group of UEs. The base station 105-b may signal the cross-TxOP trigger to the UEs in a grant the particular location of the cross-TxOP trigger bits within C-PDCCH. Or in some examples, the base station may signal such information using RRC signaling. Additionally or alternatively, a set of bits (e.g., k bits) may be used to indicate a configuration of a cross-TxOP. The set of bits may indicate whether the previously issued grant is enabled or disabled, the starting subframe offset, and/or the duration of the grant. The set of bits may be signaled to a UE or a group of UEs in a grant or, in some cases, via RRC at the location of these bits within the C-PDCCH.

At 305 UE 115-b may, in some cases, receive a cross-TxOP configuration indicating a location of the cross-TxOP grant trigger. In some cases, base station 105-b may also transmit a grant for a cross-TxOP, and the cross-TxOP configuration may be included with the cross-TxOP grant.

At 310, UE 115-b may receive a downlink control message from base station 105-b. For example, UE 115-b may receive a PDCCH, an ePDCCH, or an sPDCCH message. Multiple different C-PDCCH formats may be defined, and a UE 115 may search for control messages having the different formats (e.g., during blind decoding). Alternatively, there may be a set of consolidated formats for C-PDCCH.

At 315, UE 115-b may identify DCI of the downlink control message received at 310. The DCI may include a number of bits that corresponds to one of a predetermined number of DCI formats. In some cases, a subset of bits in the PDCCH may be decoded and other data in the same message may be re-interpreted based on a separate subset of bits that indicate the functionality. In some cases the bits within the PDCCH may be read prior to determining the format of the PDCCH (e.g., before interpreting the bits). A UE 115 may test a DCI format hypothesis associated with a blind decoding check. The C-PDCCH format may be determined based on what hypothesis passes the blind decoding check.

At 320, UE 115-b may determine a function of the downlink control message received at 310. For example, the function of the downlink control message may include triggering sPUCCH, indicating frame structure, triggering ePUCCH, and/or triggering of cross-TxOPs. The function may be determined based on the DCI identified at 315. In some cases, the function may be determined by identifying a decoding hypothesis associated with a DCI format and determining which decoding hypothesis is associated with a passed blind decoding check. The function of the downlink control message may then be determined based on whether or not the downlink control message passed the blind decoding check. In some cases, the function of the downlink control message is to trigger the cross-TxOP associated with the grant received at 305. The cross-TxOP grant trigger may include a single bit or a set of bits corresponding to multiple cross-TxOPs as described above.

At 325, UE 115-b may transmit an uplink message in response to cross-TxOP triggering, as may be the function of the downlink control message as determined at 320. If, however, the function of the downlink control message had been determined to be another of the functions as described above at 320, UE 115-b may accordingly perform an operation corresponding to that function as described above. For example, if the function of the downlink control message had been determined to be triggering sPUCCH, then UE 115-*b* may accordingly transmit an ACK or NACK.

Figure 4:
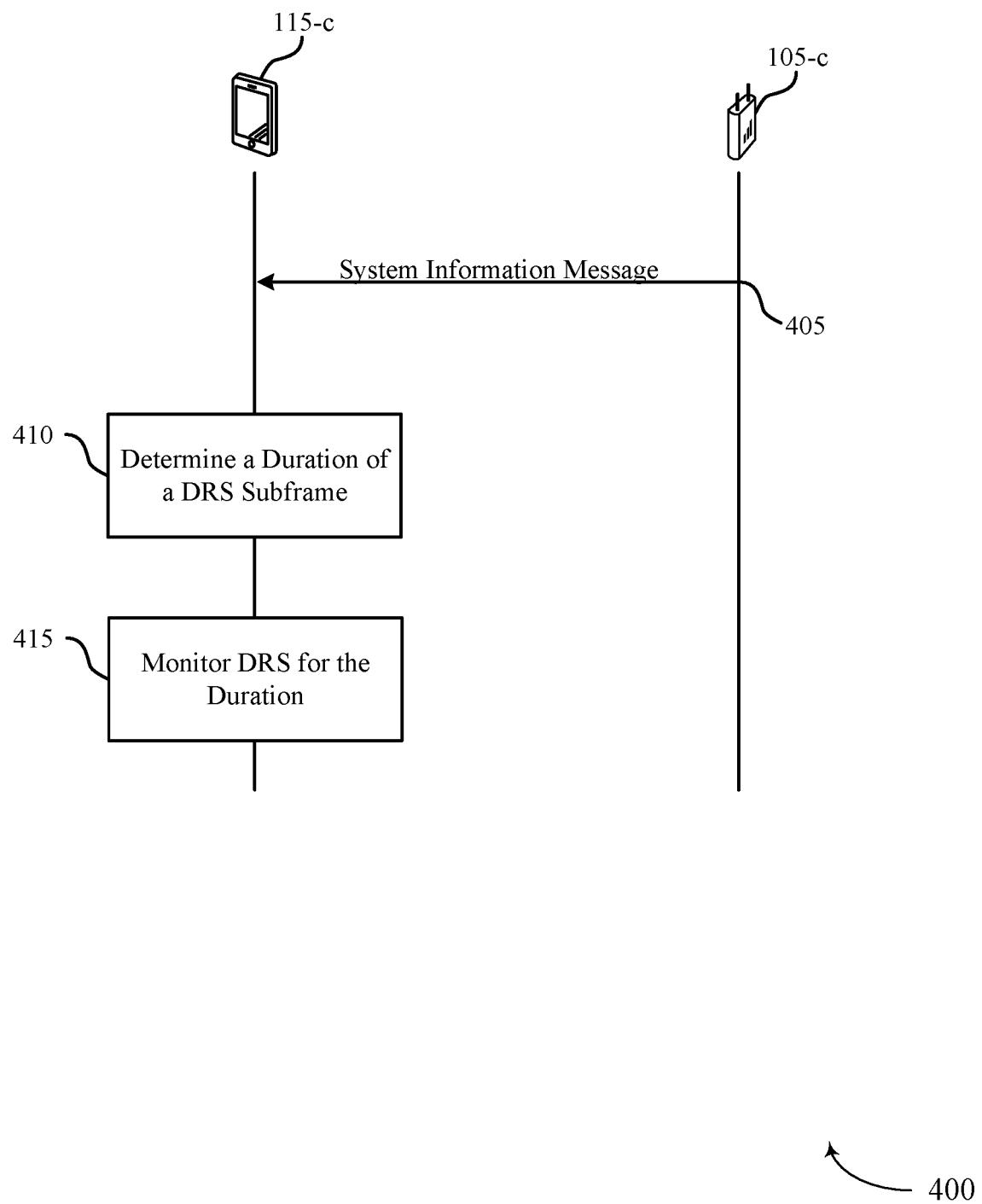
FIG. 4 illustrates an example of a process flow in a system that supports frame structure signaling for MulteFire in accordance with aspects of the present disclosure.

FIG. 4 illustrates an example of a process flow 400 for frame structure signaling for MulteFire in accordance with various aspects of the present disclosure. Process flow 400 may include base station 105-*c* and UE 115-*c*, which may be examples of the corresponding devices as described with reference to FIG. 1. Process flow 400 may represent an example in which a format of a system information message is used to indicate the length of a DRS subframe.

For example, at 405, UE 115-*c* may receive a system information message during a subframe from base station 105-*c*. For example, UE 115-*c* may receive an eSIB message. A format of a PDCCH may be used to determine the length of a subframe. Knowledge of the length of the subframe may improve decoding reliability. That is, knowing the length of a DRS subframe (e.g., 12 or 14 symbols) may allow for reliable system information decoding. eSIB decoding may be decoded reliably if the subframe length is known. As the C-PDCCH may be an optionally transmitted signal, a PDCCH may be used for determining the subframe length.

At 410, UE 115-*c* may determine a duration of a DRS subframe based on the system information message received at 405. The format of the PDCCH may be used to determine the DRS subframe length as the number of symbols in a DRS subframe may be mapped to the PDCCH format used for eSIB transmission. For example, a DCI format of the PDCCH may correspond directly to the subframe length. The method described above may also be applied to determine the length of other subframes (e.g., non-DRS subframes) as well. Thus, a UE 115 may determine the subframe length regardless of a previously transmitted C-PDCCH that may be lost or not transmitted at all. Thus, at 415, UE 115-*c* may monitor for a DRS for the duration determined at 410.

Figure 5:
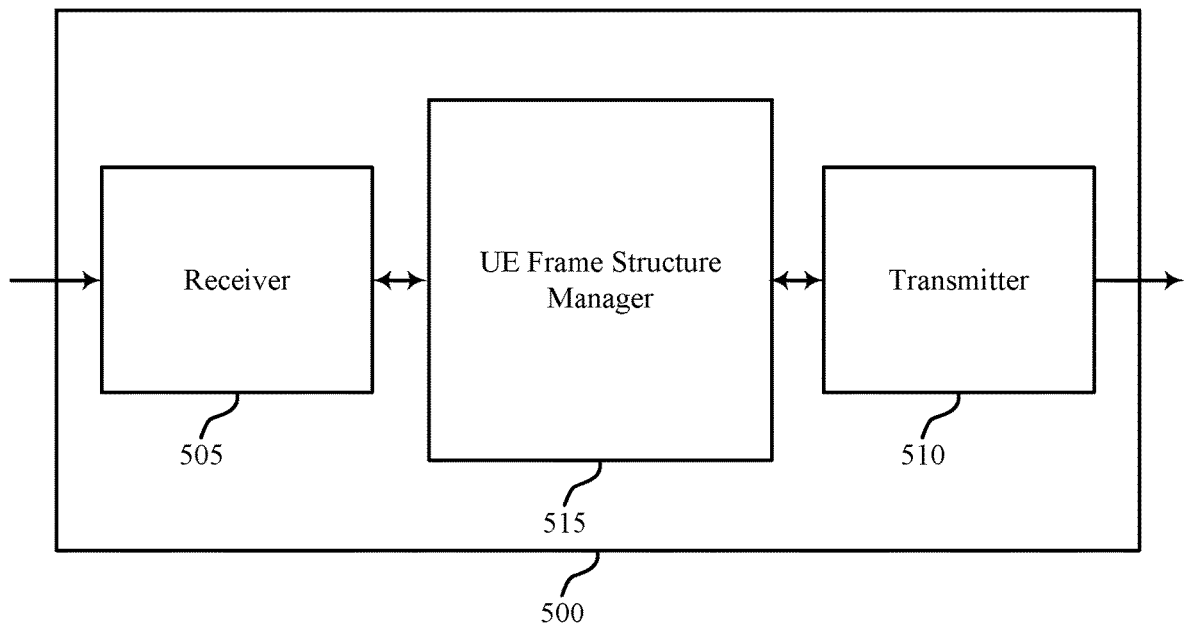
FIGS. 5 through 7 illustrate block diagrams of a wireless device that supports frame structure signaling for MulteFire in accordance with aspects of the present disclosure.

FIG. 5 illustrates a block diagram of a wireless device 500 that supports frame structure signaling for MulteFire in accordance with various aspects of the present disclosure. Wireless device 500 may be an example of aspects of a UE 115 described with reference to FIGS. 1 and 2. Wireless device 500 may include receiver 505, transmitter 510 and UE frame structure manager 515. Wireless device 500 may also include a processor. Each of these components may be in communication with each other.

The receiver 505 may receive information such as packets, user data, or control information associated with various information channels (e.g., control channels, data channels, and information related to frame structure signaling for MulteFire, etc.). Information may be passed on to other components of the device. The receiver 505 may be an example of aspects of the transceiver 825 as described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 as described with reference to FIG. 8. The transmitter 510 may include a single antenna, or it may include a plurality of antennas.

The UE frame structure manager 515 may receive a DL control message, identify DCI of the DL control message, and determine a function of the DL control message based on the DCI, where the function of the DL control message includes at least one of an sPUCCH trigger, a frame structure indication, an ePUCCH trigger, or a cross TxOP grant trigger. In some cases, a location of UL transmissions may be specified for each UE (e.g., explicitly or by using a common offset in addition to which each UE may be provided an additional offset in its grant). The UE frame structure manager 515 may also be an example of aspects of the UE frame structure manager 805 as described with reference to FIG. 8.

The UE frame structure manager 515 may also receive a DL control message using a first set of resources of a shared radio frequency spectrum band, identify a control channel type of the DL control message, determine a starting time and a time period for an UL transmission based on the control channel type of the DL control message, and transmit an UL message during the time period using the first set of resources or a second set of resources of the shared radio frequency spectrum band. In some cases, the DL control message may be a DL trigger signal.

The UE frame structure manager 515 may also receive a system information message during a subframe, determine a duration of a DRS subframe based on the system information message, and monitor for a DRS for the duration of the DRS subframe.

Figure 6:
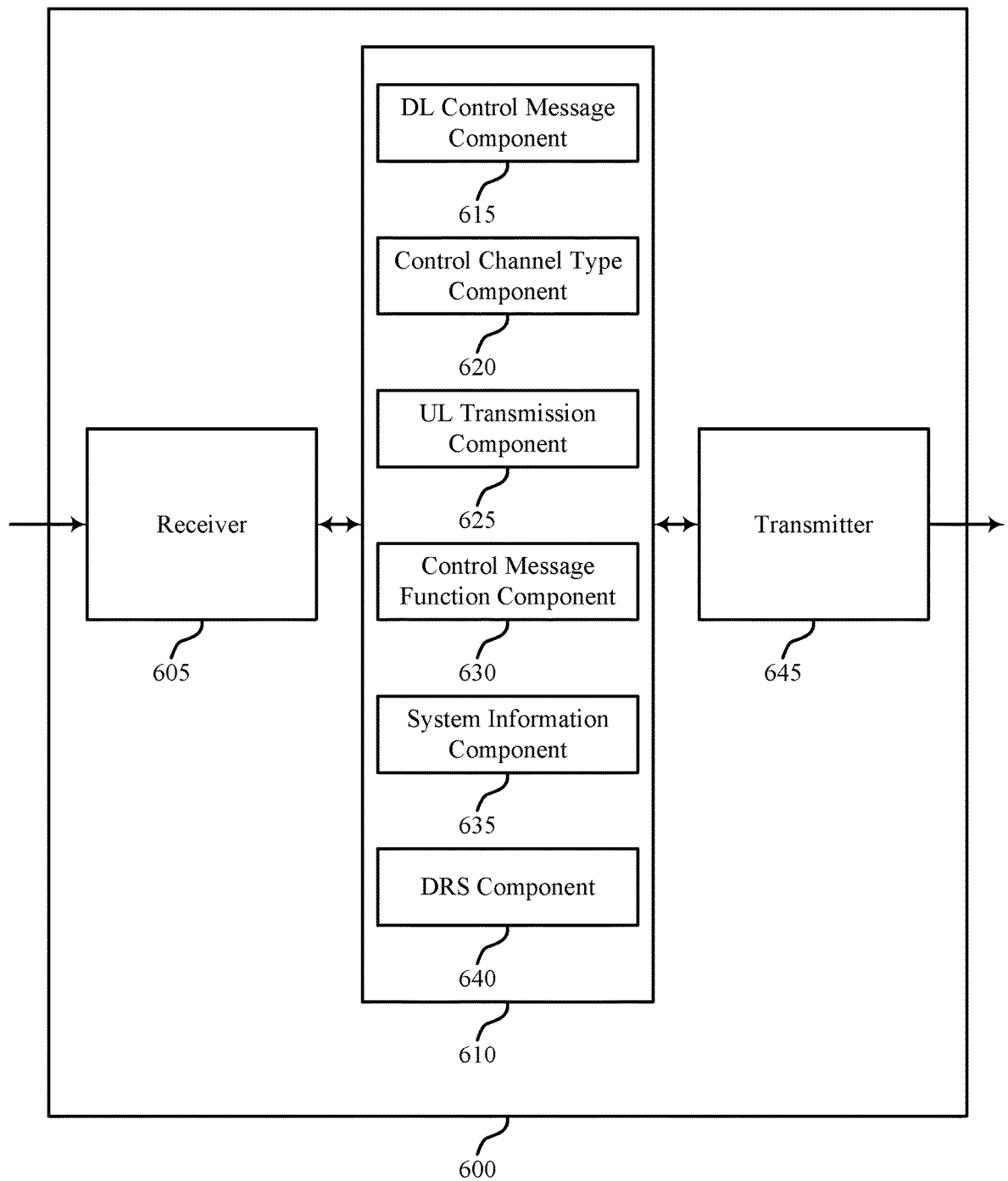

FIG. 6 illustrates a block diagram of a wireless device 600 that supports frame structure signaling for MulteFire in accordance with various aspects of the present disclosure. Wireless device 600 may be an example of aspects of a wireless device 500 or a UE 115 described with reference to FIGS. 1, 2 and 5. Wireless device 600 may include receiver 605, UE frame structure manager 610 and transmitter 645. Wireless device 600 may also include a processor. Each of these components may be in communication with each other.

The receiver 605 may receive information which may be passed on to other components of the device. The receiver 605 may also perform the functions as described with reference to the receiver 505 of FIG. 5. The receiver 605 may be an example of aspects of the transceiver 825 as described with reference to FIG. 8.

The UE frame structure manager 610 may be an example of aspects of UE frame structure manager 515 described with reference to FIG. 5. The UE frame structure manager 610 may include DL control message component 615, control channel type component 620, UL transmission component 625, control message function component 630, system information component 635 and DRS component 640. The UE frame structure manager 610 may be an example of aspects of the UE frame structure manager 805 described with reference to FIG. 8.

The DL control message component 615 may receive a DL control message, and receive a DL control message using a first set of resources of a shared radio frequency spectrum band. In some cases, the DL control message is a C-PDCCH. In some cases, the DL control message may be a DL trigger signal.

The control channel type component 620 may identify a control channel type of the DL control message. In some cases, identifying the control channel type includes: determining whether the DL control message is a PDCCH type or an ePDCCH.

The UL transmission component 625 may transmit an UL message in response to the cross-TxOP grant and the cross-TxOP grant trigger, determine a starting time and a time period for an UL transmission based on the control channel type of the DL control message, and transmit an UL message during the time period using the first set of resources or a second set of resources of the shared radio frequency spectrum band. In some cases, the time period is determined based on a UE capability. In some cases, the time period is determined based on a number of control symbols (e.g., OFDM symbols) occupied by the DL control message. In some cases, the UL message includes at least one of a PUCCH message, an sPUCCH message, an ePUCCH message, an ACK message corresponding to a previous DL transmission, or a PUSCH message.

The control message function component 630 may identify DCI of the DL control message, and determine a function of the DL control message based on the DCI, where the function of the DL control message includes at least one of an sPUCCH trigger, a frame structure indication, an ePUCCH trigger, or a cross-TxOP grant trigger. In some cases, the cross-TxOP grant trigger includes a single bit of the DL control message. In some cases, the cross-TxOP grant trigger includes a set of bits of the DL control message corresponding to a set of cross-TxOP grants. In some cases, the bits may be used to selectively activate or deactivate previously issued grants.

The system information component 635 may receive a system information message during a subframe. The DRS component 640 may determine a duration of a DRS subframe based on the system information message, and monitor for a DRS for the duration of the DRS subframe.

The transmitter 645 may transmit signals received from other components of wireless device 600. In some examples, the transmitter 645 may be collocated with a receiver in a transceiver module. For example, the transmitter 645 may be an example of aspects of the transceiver 825 as described with reference to FIG. 8. The transmitter 645 may utilize a single antenna, or it may utilize a plurality of antennas.

Figure 7:
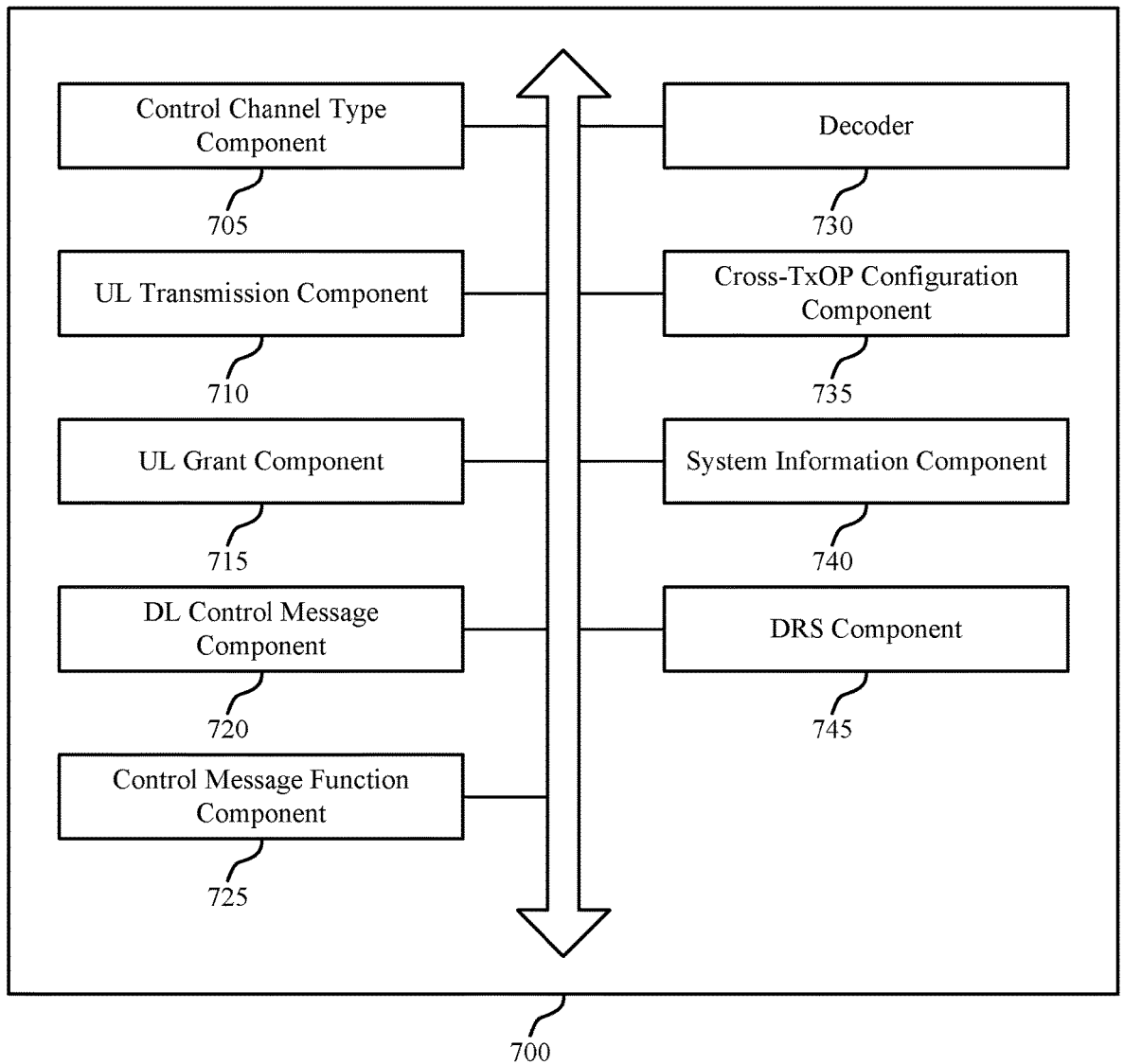

FIG. 7 illustrates a block diagram of a UE frame structure manager 700 which may be an example of the corresponding component of wireless device 500 or wireless device 600. That is, UE frame structure manager 700 may be an example of aspects of UE frame structure manager 515 or UE frame structure manager 610 as described with reference to FIGS. 5 and 6. The UE frame structure manager 700 may also be an example of aspects of the UE frame structure manager 805 as described with reference to FIG. 8.

The UE frame structure manager 700 may include control channel type component 705, UL transmission component 710, UL grant component 715, DL control message component 720, control message function component 725, decoder 730, cross-TxOP configuration component 735, system information component 740 and DRS component 745. Each of these modules may communicate, directly or indirectly, with one another (e.g., via one or more buses).

The control channel type component 705 may identify a control channel type of the DL control message. The UL transmission component 710 may transmit an UL message in response to the cross-TxOP grant and the cross-TxOP grant trigger, determine a starting time and a time period for an UL transmission based on the control channel type of the DL control message, and transmit an UL message during the time period using the first set of resources or a second set of resources of the shared radio frequency spectrum band.

The UL grant component 715 may receive a grant for a PUSCH transmission before receiving the DL control message, such as a cross-TxOP grant, where the function of the DL control message is the cross-TxOP grant trigger and the cross-TxOP grant is received before the cross-TxOP grant trigger.

The DL control message component 720 may receive a DL control message, and receive a DL control message using a first set of resources of a shared radio frequency spectrum band.

The control message function component 725 may identify DCI of the DL control message, and determine a function of the DL control message based on the DCI, where the function of the DL control message includes at least one of an sPUCCH trigger, a frame structure indication, an ePUCCH trigger, or a cross-TxOP grant trigger. The decoder 730 may identify a decoding hypothesis associated with a DCI format, determine that the DL control message passed a blind decoding check associated with the decoding hypothesis, where the function of the DL control message is determined based on the determination that the DL control message passed the blind decoding check, and decode a first portion of the DCI, where determining the function of the DL control message includes interpreting a second portion of the DCI based on the first portion of the DCI.

The cross-TxOP configuration component 735 may receive a cross-TxOP configuration indicating a location of the cross-TxOP grant trigger. The system information component 740 may receive a system information message during a subframe. The DRS component 745 may determine a duration of a DRS subframe based on the system information message, and monitor for a DRS for the duration of the DRS subframe. In some cases, a location of UL transmissions may be specified for each UE (e.g., explicitly or by using a common offset in addition to which each UE may be provided an additional offset in its grant).

Figure 8:
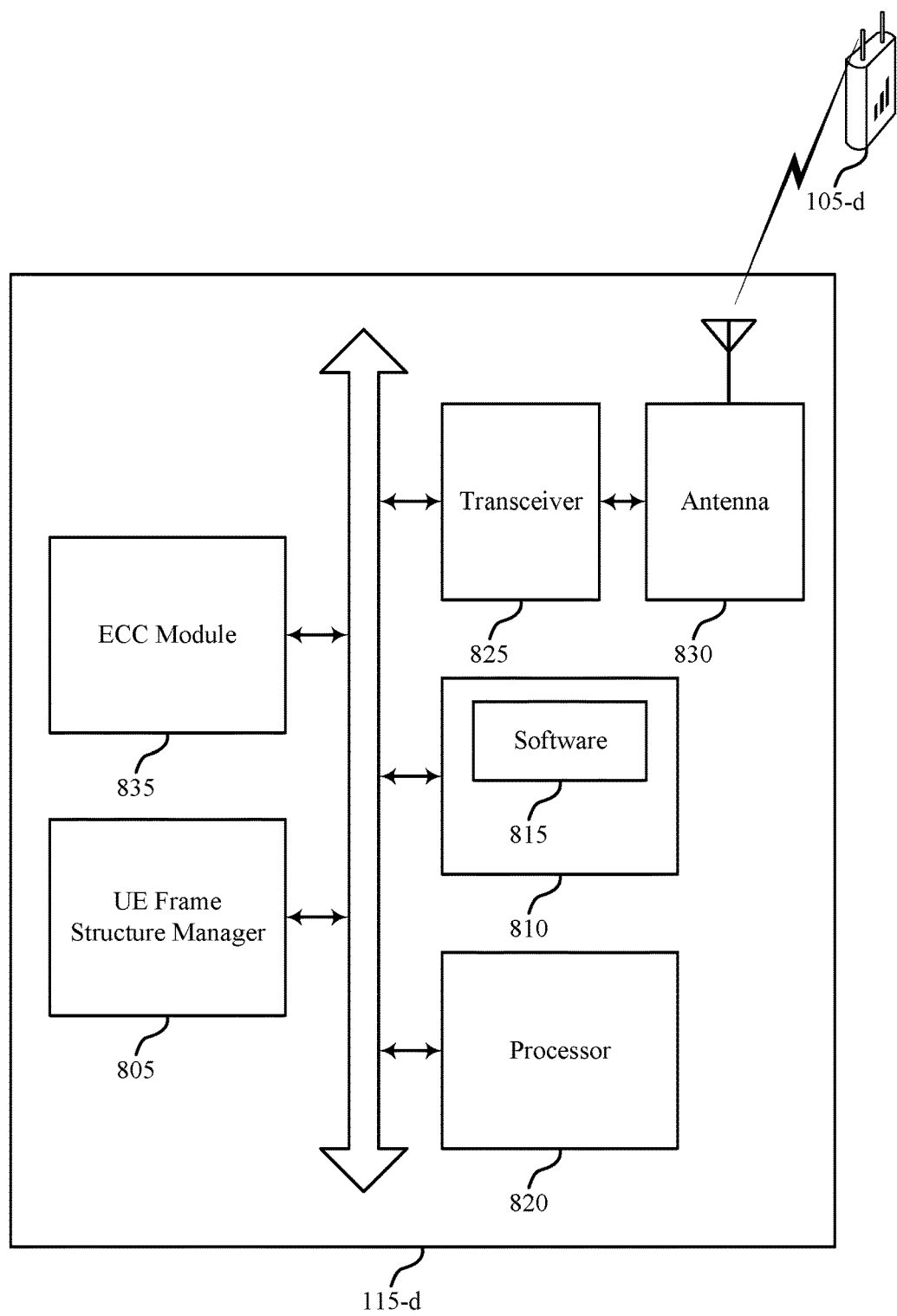
FIG. 8 illustrates a block diagram of a system including a UE that supports frame structure signaling for MulteFire in accordance with aspects of the present disclosure.

FIG. 8 illustrates a diagram of a system 800 including a device that supports frame structure signaling for MulteFire in accordance with various aspects of the present disclosure. For example, system 800 may include UE 115-d, which may be an example of a wireless device 500, a wireless device 600, or a UE 115 as described with reference to FIGS. 1, 2 and 5 through 7.

UE 115-d may also include UE frame structure manager 805, memory 810, processor 820, transceiver 825, antenna 830 and ECC module 835. Each of these modules may communicate, directly or indirectly, with one another (e.g., via one or more buses). The UE frame structure manager 805 may be an example of a UE frame structure manager as described with reference to FIGS. 5 through 7.

The memory 810 may include random access memory (RAM) and read only memory (ROM). The memory 810 may store computer-readable, computer-executable software including instructions that, when executed, cause the apparatus to perform various functions described herein (e.g., frame structure signaling for MulteFire, etc.). In some cases, the software 815 may not be directly executable by the processor but may cause a computer (e.g., when compiled and executed) to perform functions described herein.

The processor 820 may include an intelligent hardware device, (e.g., a central processing unit (CPU), a microcontroller, an application specific integrated circuit (ASIC), etc.) The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

ECC module 835 may enable operations using enhanced component carriers (eCCs) such as communication using shared or unlicensed spectrum, using reduced TTIs or subframe durations, or using a large number of component carriers.

Figure 9:
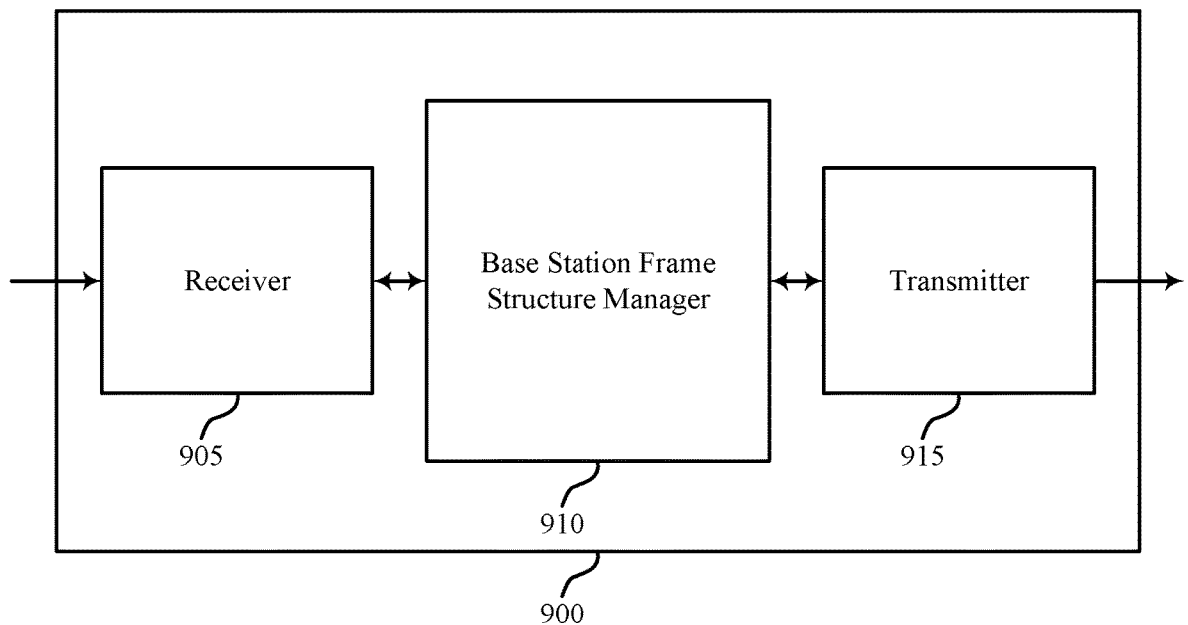
FIGS. 9 through 11 illustrate block diagrams of a wireless device that supports frame structure signaling for MulteFire in accordance with aspects of the present disclosure.

FIG. 9 illustrates a block diagram of a wireless device 900 that supports frame structure signaling for MulteFire in accordance with various aspects of the present disclosure. Wireless device 900 may be an example of aspects of a base station 105 described with reference to FIGS. 1 and 2. Wireless device 900 may include receiver 905, base station frame structure manager 910 and transmitter 915. Wireless device 900 may also include a processor. Each of these components may be in communication with each other.

The receiver 905 may receive information such as packets, user data, or control information associated with various information channels (e.g., control channels, data channels, and information related to frame structure signaling for MulteFire, etc.). Information may be passed on to other components of the device. The receiver 905 may be an example of aspects of the transceiver 1225 as described with reference to FIG. 12.

The base station frame structure manager 910 may identify a control channel type of a DL control message, transmit the DL control message using a first set of resources of a shared radio frequency spectrum band, determine a starting time and a time period for an UL transmission based on the control channel type of the DL control message, receive an UL message during the time period using the first set of resources or a second set of resources of the shared radio frequency spectrum band, The base station frame structure manager 910 may also configure a function of a DL control message, where the function includes at least one of an sPUCCH trigger, a frame structure indication, an ePUCCH trigger, or a cross-TxOP grant trigger, select DCI of the DL control message based on the function of the DL control message, transmit the DL control message, The base station frame structure manager 910 may also identify a duration of a DRS subframe to be monitored, transmit and indication of the duration of the DRS subframe in a system information message, and transmit a DRS for the duration of the DRS subframe. The base station frame structure manager 910 may also be an example of aspects of the base station frame structure manager 1205 as described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 as described with reference to FIG. 12. The transmitter 915 may include a single antenna, or it may include a plurality of antennas.

Figure 10:
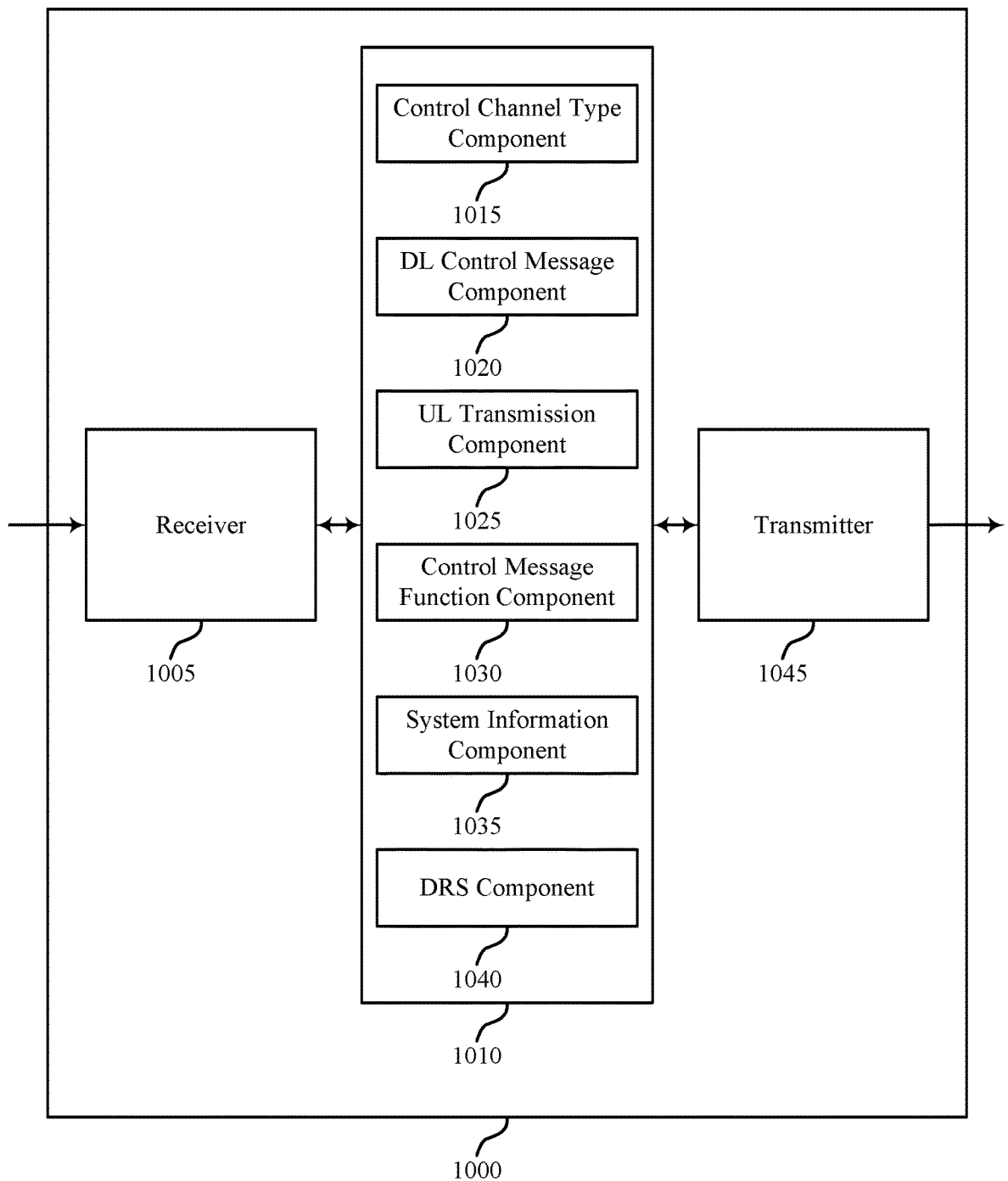

FIG. 10 illustrates a block diagram of a wireless device 1000 that supports frame structure signaling for MulteFire in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station frame structure manager 1010 and transmitter 1045. Wireless device 1000 may also include a processor. Each of these components may be in communication with each other.

The receiver 1005 may receive information which may be passed on to other components of the device. The receiver 1005 may also perform the functions as described with reference to the receiver 905 of FIG. 9. The receiver 1005 may be an example of aspects of the transceiver 1225 described with reference to FIG. 12.

The base station frame structure manager 1010 may be an example of aspects of base station frame structure manager 910 as described with reference to FIG. 9. The base station frame structure manager 1010 may include control channel type component 1015, DL control message component 1020, UL transmission component 1025, control message function component 1030, system information component 1035 and DRS component 1040. The base station frame structure manager 1010 may be an example of aspects of the base station frame structure manager 1205 as described with reference to FIG. 12.

The control channel type component 1015 may identify a control channel type of a DL control message. In some cases, identifying the control channel type includes: determining whether the DL control message is a PDCCH type or an ePDCCH.

The DL control message component 1020 may transmit the DL control message using a first set of resources of a shared radio frequency spectrum band, select DCI of the DL control message based on the function of the DL control message, and transmit the DL control message. In some cases, the DL control message is a C-PDCCH.

The UL transmission component 1025 may determine a starting time and a time period for an UL transmission based on the control channel type of the DL control message, receive an UL message during the time period using the first set of resources or a second set of resources of the shared radio frequency spectrum band, and receive an UL message in response to the cross-TxOP grant and the cross-TxOP grant trigger. In some cases, the time period is determined based on a UE capability. In some cases, the time period is determined based on a number of control symbols occupied by the DL control message. In some cases, the UL message includes at least one of a PUCCH message, an sPUCCH message, an ePUCCH message, an ACK message corresponding to a previous DL transmission, or a PUSCH message.

The control message function component 1030 may configure a function of a DL control message, where the function includes at least one of an sPUCCH trigger, a frame structure indication, an ePUCCH trigger, or a cross-TxOP grant trigger. In some cases, the cross-TxOP grant trigger includes a single bit of the DL control message. In some cases, the cross-TxOP grant trigger includes a set of bits of the DL control message corresponding to a set of cross-TxOP grants. In some cases, the bits may be used to selectively activate or deactivate previously issued grants.

The system information component 1035 may transmit and indication of the duration of the DRS subframe in a system information message. The DRS component 1040 may identify a duration of a DRS subframe to be monitored, and transmit a DRS for the duration of the DRS subframe.

The transmitter 1045 may transmit signals received from other components of wireless device 1000. In some examples, the transmitter 1045 may be collocated with a receiver in a transceiver module. For example, the transmitter 1045 may be an example of aspects of the transceiver 1225 as described with reference to FIG. 12. The transmitter 1045 may utilize a single antenna, or it may utilize a plurality of antennas.

Figure 11:
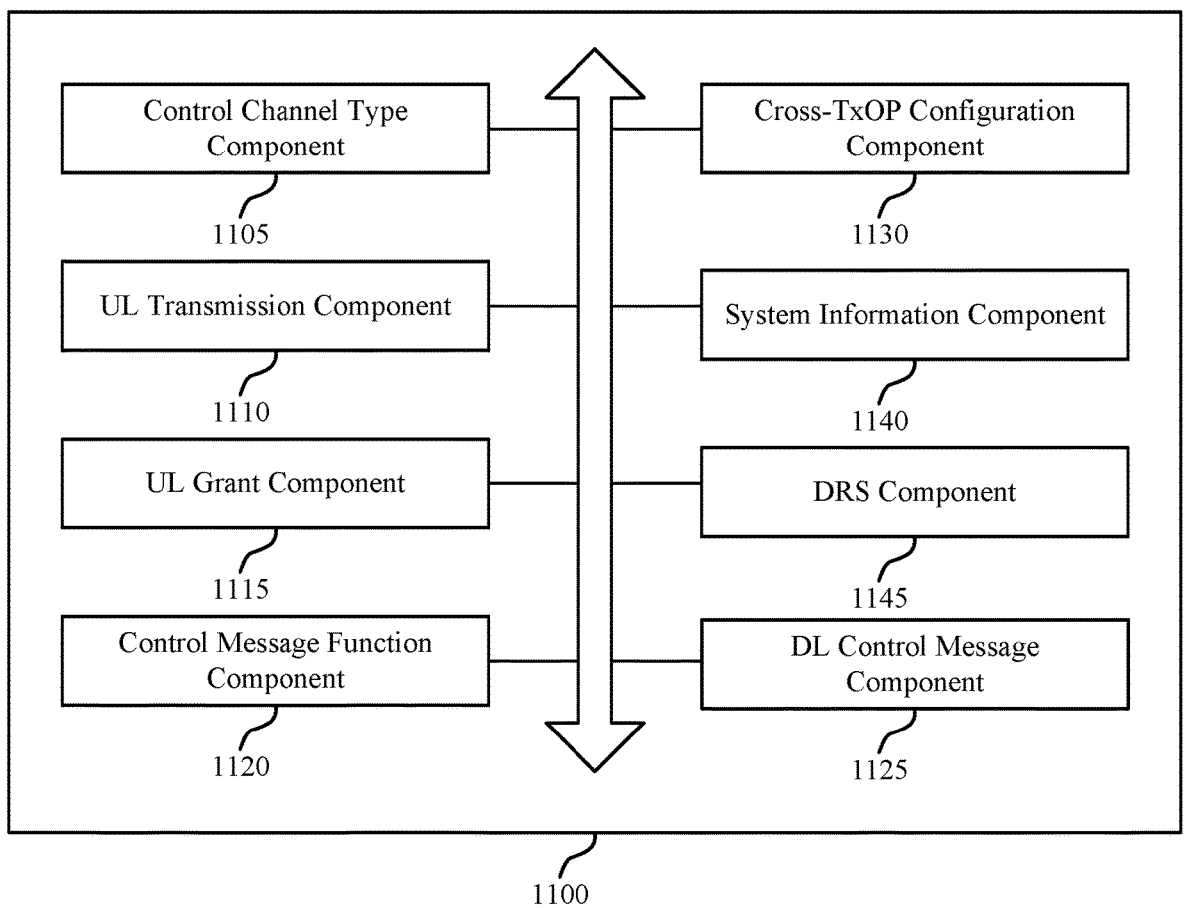

FIG. 11 illustrates a block diagram of a base station frame structure manager 1100 which may be an example of the corresponding component of wireless device 900 or wireless device 1000. That is, base station frame structure manager 1100 may be an example of aspects of base station frame structure manager 910 or base station frame structure manager 1010 described with reference to FIGS. 9 and 10. The base station frame structure manager 1100 may also be an example of aspects of the base station frame structure manager 1205 as described with reference to FIG. 12.

The base station frame structure manager 1100 may include control channel type component 1105, UL transmission component 1110, UL grant component 1115, control message function component 1120, DL control message component 1125, cross-TxOP configuration component 1130, system information component 1140 and DRS component 1145. Each of these modules may communicate, directly or indirectly, with one another (e.g., via one or more buses).

The control channel type component 1105 may identify a control channel type of a DL control message. In some cases, identifying the control channel type includes: determining whether the DL control message is a PDCCH type or an ePDCCH. In some cases, the control channel type includes a duplexing configuration of the DL control message.

The UL transmission component 1110 may determine a starting time and a time period for an UL transmission based on the control channel type of the DL control message, receive an UL message during the time period using the first set of resources or a second set of resources of the shared radio frequency spectrum band, and receive an UL message in response to the cross-TxOP grant and the cross-TxOP grant trigger. In some cases, the time period is determined based on a UE capability. In some cases, the time period is determined based on a number of control symbols occupied by the DL control message. In some cases, the control symbols may be OFDM symbols. In some cases, the UL message includes at least one of a PUCCH message, an sPUCCH message, an ePUCCH message, an ACK message corresponding to a previous DL transmission, or a PUSCH message.

The UL grant component 1115 may transmit a grant for a PUSCH transmission before transmitting the DL control message, such as a cross-TxOP grant, where the function of the DL control message is the cross-TxOP grant trigger and the cross-TxOP grant is transmitted before the cross-TxOP grant trigger.

The control message function component 1120 may configure a function of a DL control message, where the function includes at least one of an sPUCCH trigger, a frame structure indication, an ePUCCH trigger, or a cross-TxOP grant trigger. In some cases, the cross-TxOP grant trigger includes a single bit of the DL control message. In some cases, the cross-TxOP grant trigger includes a set of bits of the DL control message corresponding to a set of cross-TxOP grants. In some cases, the bits may be used to selectively activate or deactivate previously issued grants.

The DL control message component 1125 may transmit the DL control message using a first set of resources of a shared radio frequency spectrum band, select DCI of the DL control message based on the function of the DL control message, and transmit the DL control message. In some cases, the DL control message is a C-PDCCH.

The cross-TxOP configuration component 1130 may transmit a cross-TxOP configuration indicating a location of the cross-TxOP grant trigger. The system information component 1140 may transmit and indication of the duration of the DRS subframe in a system information message. The DRS component 1145 may identify a duration of a DRS subframe to be monitored, and transmit a DRS for the duration of the DRS subframe.

Figure 12:
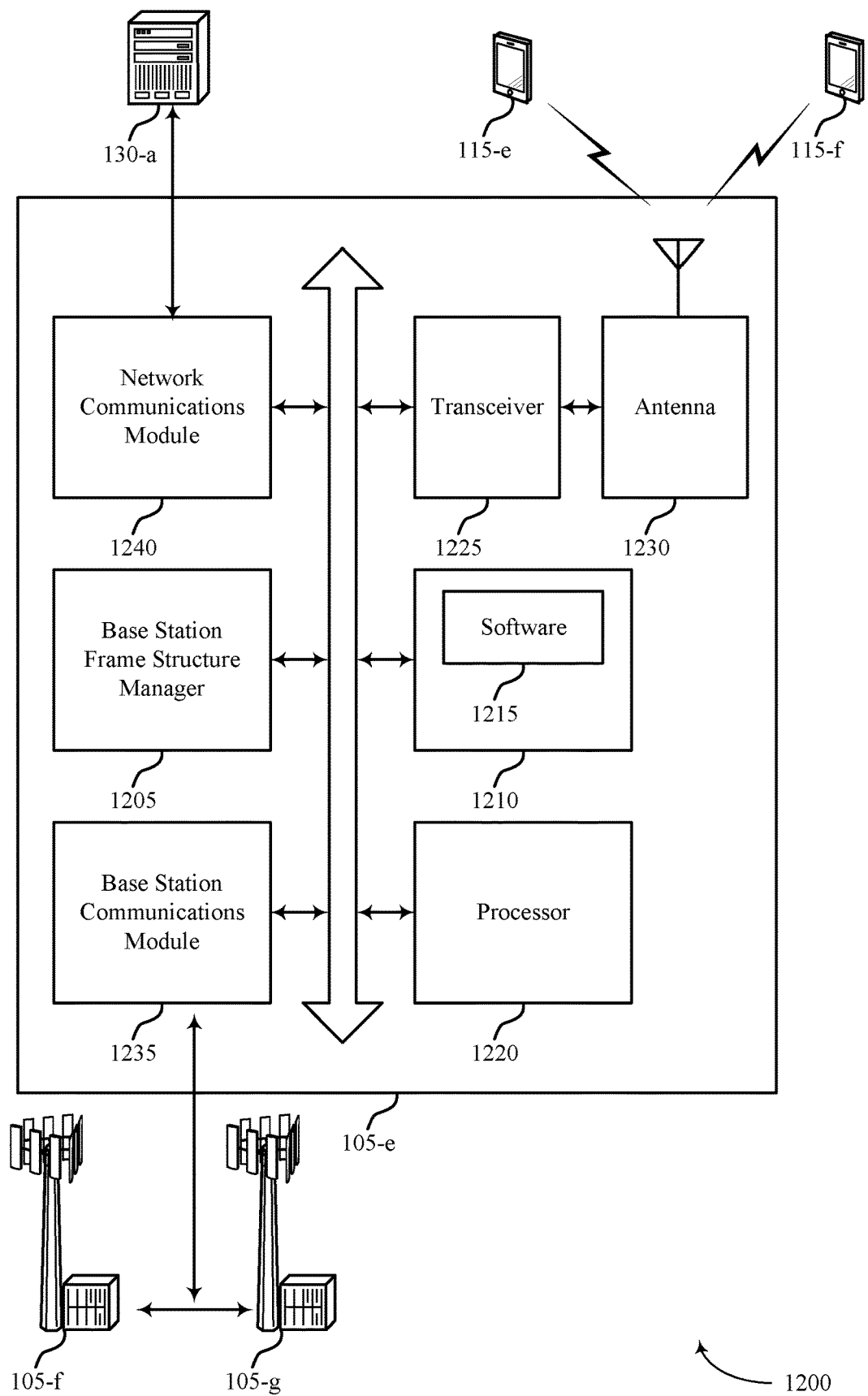
FIG. 12 illustrates a block diagram of a system including a base station that supports frame structure signaling for MulteFire in accordance with aspects of the present disclosure.

FIG. 12 illustrates a diagram of a wireless system 1200 including a device configured that supports frame structure signaling for MulteFire in accordance with various aspects of the present disclosure. For example, system 1200 may include base station 105-e, which may be an example of a wireless device 900, a wireless device 1000, or a base station 105 as described with reference to FIGS. 1, 2 and 9 through 11. Base station 105-e may also include components for bi-directional voice and data communications including components for transmitting communications and components for receiving communications. For example, base station 105-e may communicate bi-directionally with one or more UEs 115.

Base station 105-e may also include base station frame structure manager 1205, memory 1210, processor 1220, transceiver 1225, antenna 1230, base station communications module 1235 and network communications module 1240. Each of these modules may communicate, directly or indirectly, with one another (e.g., via one or more buses). The base station frame structure manager 1205 may be an example of a base station frame structure manager as described with reference to FIGS. 9 through 11.

The memory 1210 may include RAM and ROM. The memory 1210 may store computer-readable, computer-executable software including instructions that, when executed, cause the apparatus to perform various functions described herein (e.g., frame structure signaling for MulteFire, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
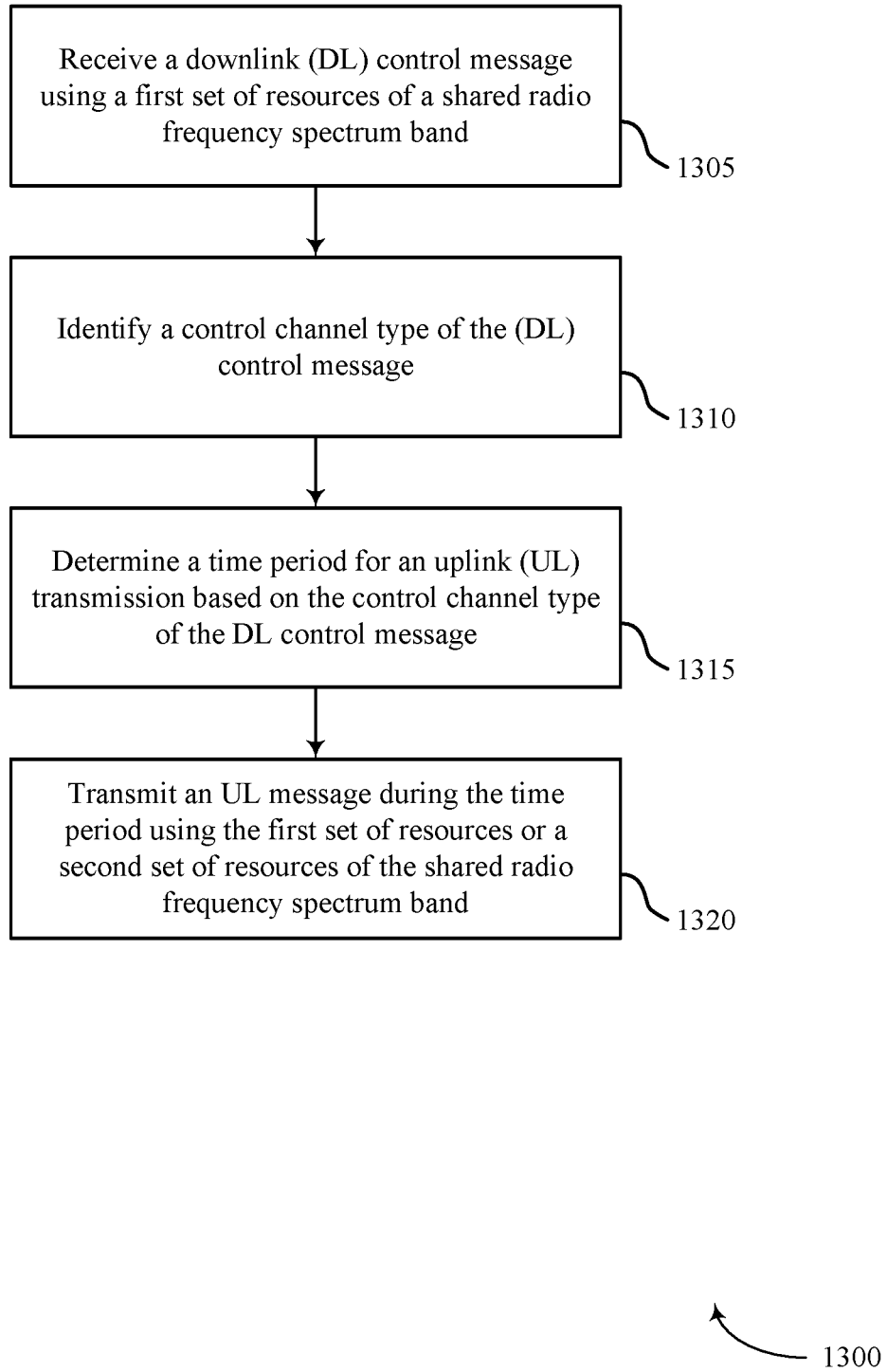
FIGS. 13 through 18 illustrate methods for frame structure signaling for MulteFire in accordance with aspects of the present disclosure.

FIG. 13 illustrates a flowchart illustrating a method 1300 for frame structure signaling for MulteFire in accordance with various aspects of the present disclosure. The operations of method 1300 may be implemented by a device such as a UE 115 or its components as described with reference to FIGS. 1 and 2. For example, the operations of method 1300 may be performed by the UE frame structure manager, such as 515 or 805, as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may receive a DL control message using a first set of resources of a shared radio frequency spectrum band as described above with reference to FIGS. 2 through 4. In certain examples, the operations of block 1305 may be performed by the DL control message component as described with reference to FIGS. 6 and 7.

At block 1310, the UE 115 may identify a control channel type of the DL control message as described above with reference to FIGS. 2 through 4. In certain examples, the operations of block 1310 may be performed by the control channel type component as described with reference to FIGS. 6 and 7.

At block 1315, the UE 115 may determine a starting time and a time period for an UL transmission based on the control channel type of the DL control message as described above with reference to FIGS. 2 through 4. In certain examples, the operations of block 1315 may be performed by the UL transmission component as described with reference to FIGS. 6 and 7.

At block 1320, the UE 115 may transmit an UL message during the time period using the first set of resources or a second set of resources of the shared radio frequency spectrum band as described above with reference to FIGS. 2 through 4. In certain examples, the operations of block 1320 may be performed by the UL transmission component as described with reference to FIGS. 6 and 7.

Figure 14:
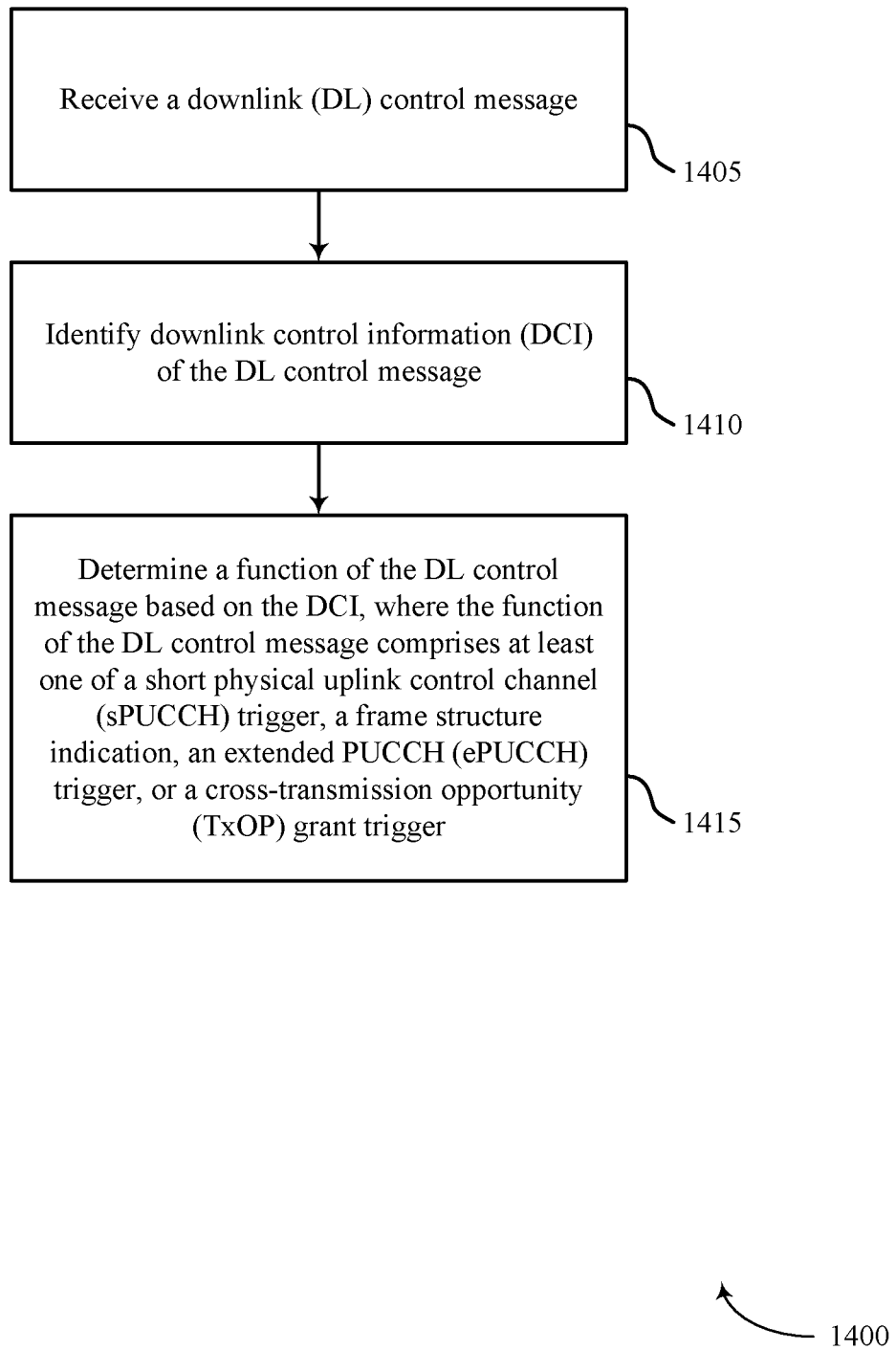

FIG. 14 illustrates a flowchart illustrating a method 1400 for frame structure signaling for MulteFire in accordance with various aspects of the present disclosure. The operations of method 1400 may be implemented by a device such as a UE 115 or its components as described with reference to FIGS. 1 and 2. For example, the operations of method 1400 may be performed by the UE frame structure manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may receive a DL control message as described above with reference to FIGS. 2 through 4. In certain examples, the operations of block 1405 may be performed by the DL control message component as described with reference to FIGS. 6 and 7.

At block 1410, the UE 115 may identify DCI of the DL control message as described above with reference to FIGS. 2 through 4. In certain examples, the operations of block 1410 may be performed by the control message function component as described with reference to FIGS. 6 and 7.

At block 1415, the UE 115 may determine a function of the DL control message based on the DCI, where the function of the DL control message includes at least one of a sPUCCH trigger, a frame structure indication, an ePUCCH trigger, or a cross-TxOP grant trigger as described above with reference to FIGS. 2 through 4. In certain examples, the operations of block 1415 may be performed by the control message function component as described with reference to FIGS. 6 and 7.

Figure 15:
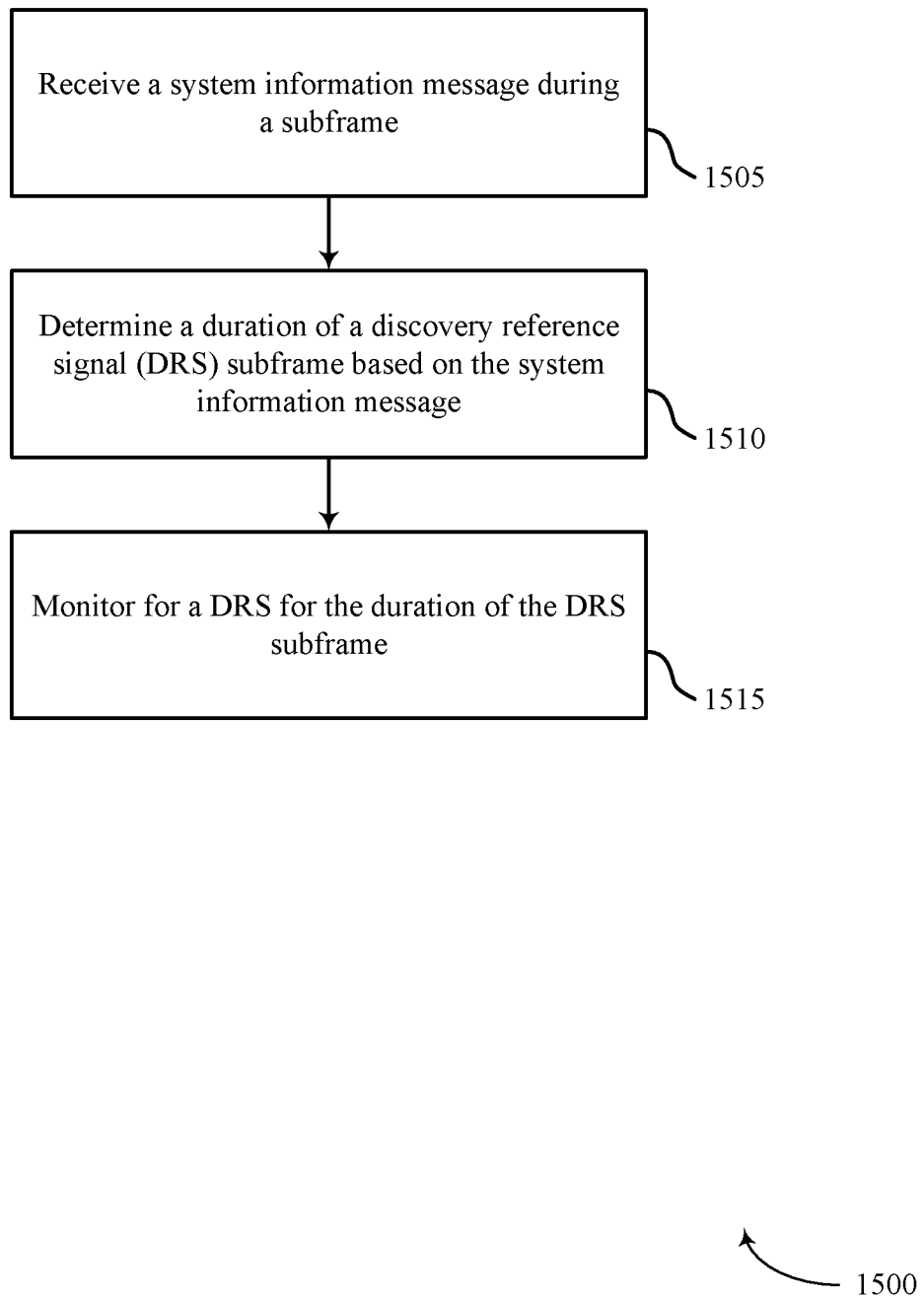

FIG. 15 illustrates a flowchart illustrating a method 1500 for frame structure signaling for MulteFire in accordance with various aspects of the present disclosure. The operations of method 1500 may be implemented by a device such as a UE 115 or its components as described with reference to FIGS. 1 and 2. For example, the operations of method 1500 may be performed by the UE frame structure manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a system information message during a subframe as described above with reference to FIGS. 2 through 4. In certain examples, the operations of block 1505 may be performed by the system information component as described with reference to FIGS. 6 and 7.

At block 1510, the UE 115 may determine a duration of a DRS subframe based on the system information message as described above with reference to FIGS. 2 through 4. In certain examples, the operations of block 1510 may be performed by the DRS component as described with reference to FIGS. 6 and 7.

At block 1515, the UE 115 may monitor for a DRS for the duration of the DRS subframe as described above with reference to FIGS. 2 through 4. In certain examples, the operations of block 1515 may be performed by the DRS component as described with reference to FIGS. 6 and 7.

Figure 16:
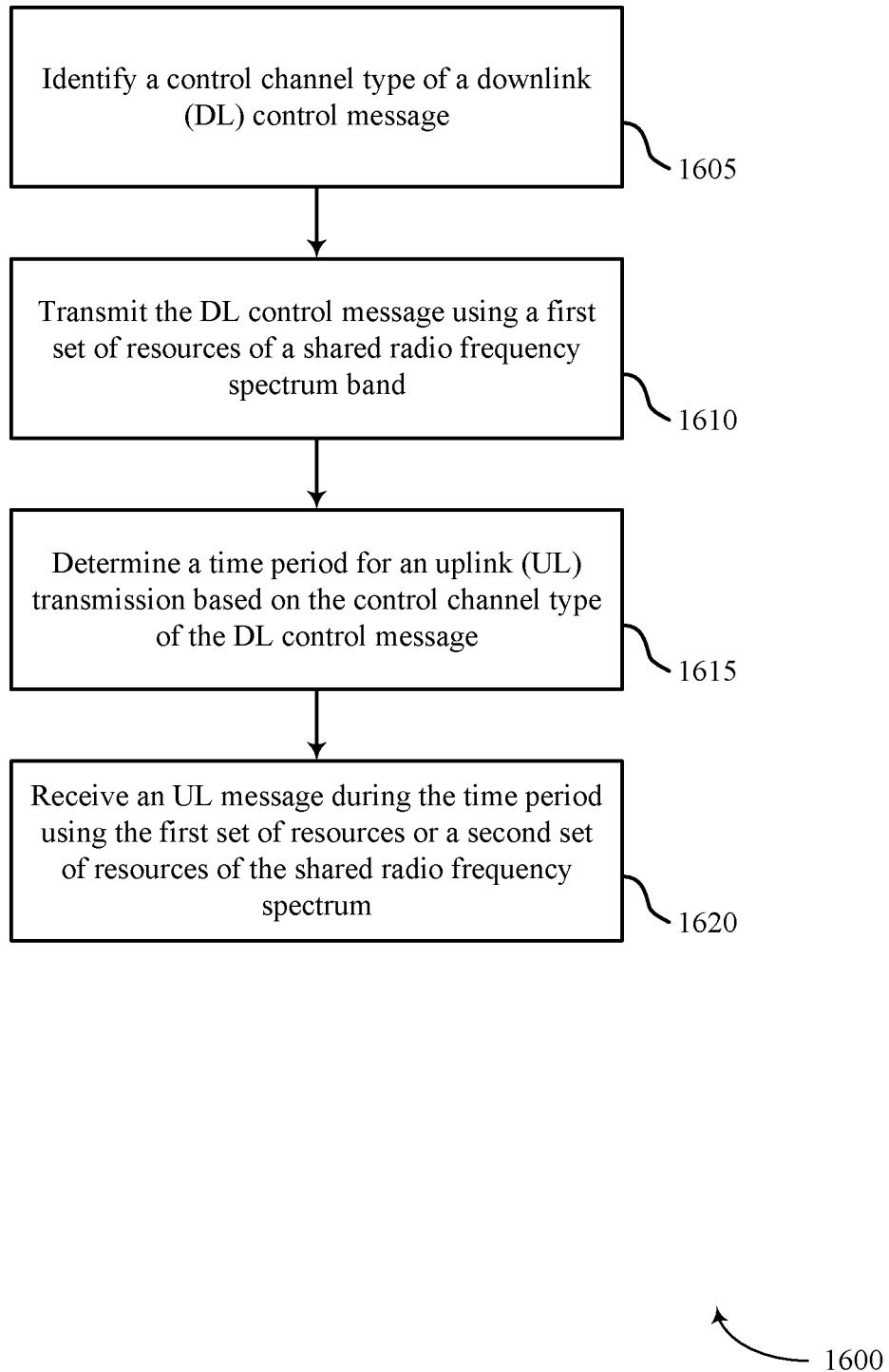

FIG. 16 illustrates a flowchart illustrating a method 1600 for frame structure signaling for MulteFire in accordance with various aspects of the present disclosure. The operations of method 1600 may be implemented by a device such as a base station 105 or its components as described with reference to FIGS. 1 and 2. For example, the operations of method 1600 may be performed by the base station frame structure manager as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may identify a control channel type of a DL control message as described above with reference to FIGS. 2 through 4. In certain examples, the operations of block 1605 may be performed by the control channel type component as described with reference to FIGS. 10 and 11.

At block 1610, the base station 105 may transmit the DL control message using a first set of resources of a shared radio frequency spectrum band as described above with reference to FIGS. 2 through 4. In certain examples, the operations of block 1610 may be performed by the DL control message component as described with reference to FIGS. 10 and 11.

At block 1615, the base station 105 may determine a starting time and a time period for an UL transmission based on the control channel type of the DL control message as described above with reference to FIGS. 2 through 4. In certain examples, the operations of block 1615 may be performed by the UL transmission component as described with reference to FIGS. 10 and 11.

At block 1620, the base station 105 may receive an UL message during the time period using the first set of resources or a second set of resources of the shared radio frequency spectrum as described above with reference to FIGS. 2 through 4. In certain examples, the operations of block 1620 may be performed by the UL transmission component as described with reference to FIGS. 10 and 11.

Figure 17:
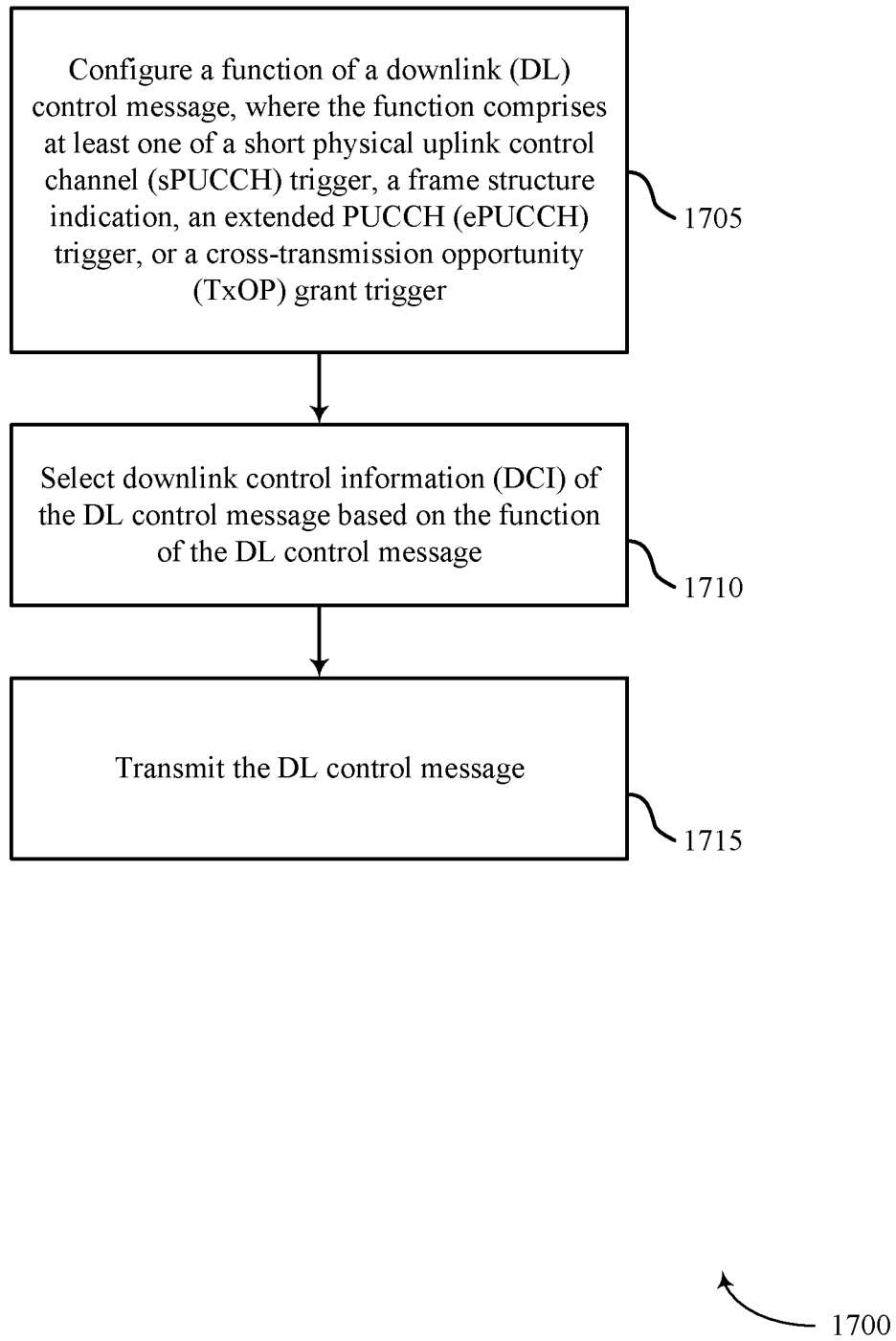

FIG. 17 illustrates a flowchart illustrating a method 1700 for frame structure signaling for MulteFire in accordance with various aspects of the present disclosure. The operations of method 1700 may be implemented by a device such as a base station 105 or its components as described with reference to FIGS. 1 and 2. For example, the operations of method 1700 may be performed by the base station frame structure manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may configure a function of a DL control message, where the function includes at least one of an sPUCCH trigger, a frame structure indication, an ePUCCH trigger, or a cross-TxOP grant trigger as described above with reference to FIGS. 2 through 4. In certain examples, the operations of block 1705 may be performed by the control message function component as described with reference to FIGS. 10 and 11.

At block 1710, the base station 105 may select downlink DCI of the DL control message based on the function of the DL control message as described above with reference to FIGS. 2 through 4. In certain examples, the operations of block 1710 may be performed by the DL control message component as described with reference to FIGS. 10 and 11.

At block 1715, the base station 105 may transmit the DL control message as described above with reference to FIGS. 2 through 4. In certain examples, the operations of block 1715 may be performed by the DL control message component as described with reference to FIGS. 10 and 11.

Figure 18:
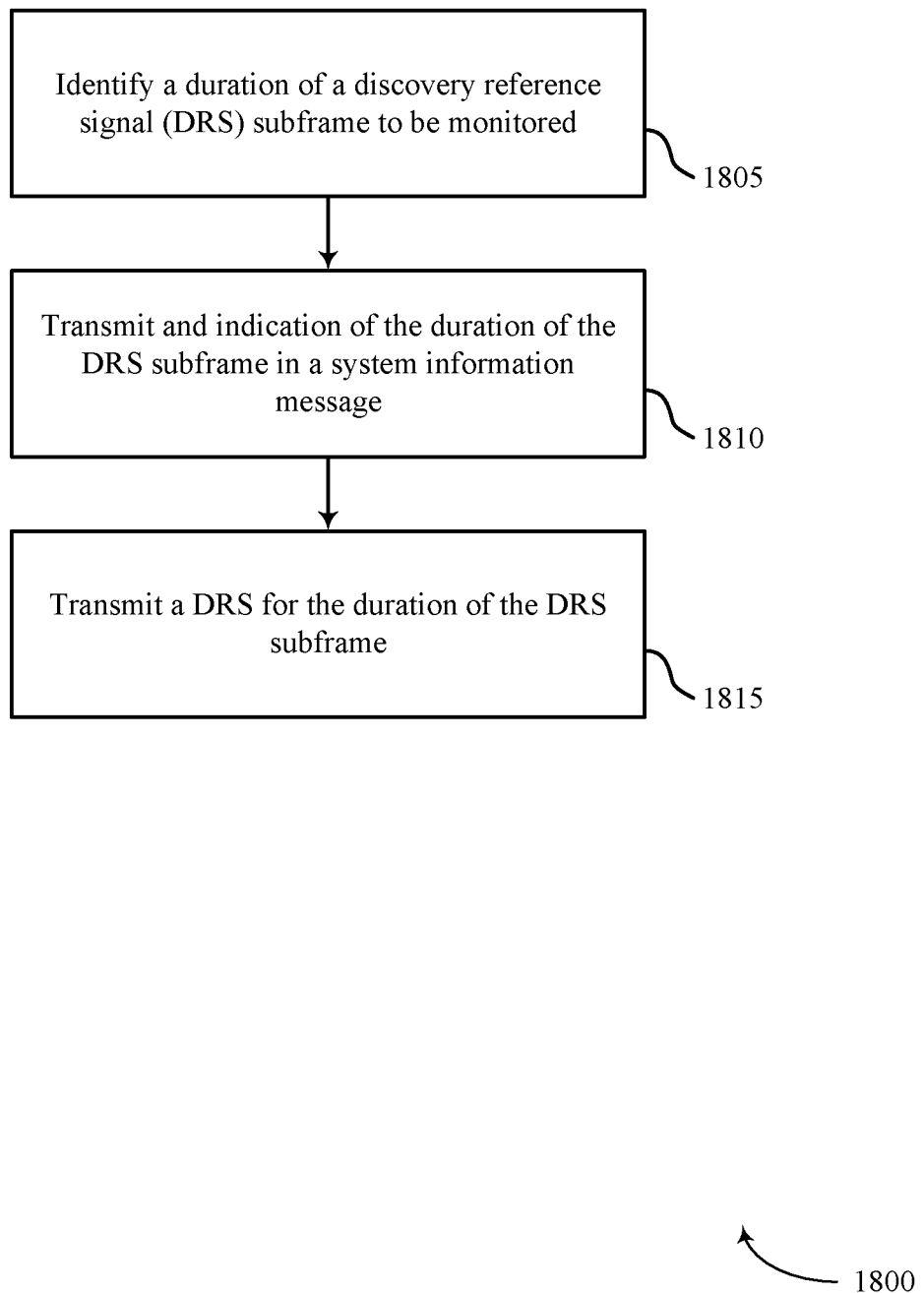

FIG. 18 illustrates a flowchart illustrating a method 1800 for frame structure signaling for MulteFire in accordance with various aspects of the present disclosure. The operations of method 1800 may be implemented by a device such as a base station 105 or its components as described with reference to FIGS. 1 and 2. For example, the operations of method 1800 may be performed by the base station frame structure manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may identify a duration of a DRS subframe to be monitored as described above with reference to FIGS. 2 through 4. In certain examples, the operations of block 1805 may be performed by the DRS component as described with reference to FIGS. 10 and 11.

At block 1810, the base station 105 may transmit and indication of the duration of the DRS subframe in a system information message as described above with reference to FIGS. 2 through 4. In certain examples, the operations of block 1810 may be performed by the system information component as described with reference to FIGS. 10 and 11.

At block 1815, the base station 105 may transmit a DRS for the duration of the DRS subframe as described above with reference to FIGS. 2 through 4. In certain examples, the operations of block 1815 may be performed by the DRS component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. It should be noted that the methods are just example implementations, and that the operations of the methods may be rearranged or otherwise modified such that the other implementations are possible. For example, aspects of each of the methods may include steps or aspects of the other methods, or other steps or techniques described herein. Thus, aspects of the disclosure may provide for frame structure signaling for Multe-Fire.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for frame structure signaling for MulteFire. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication, comprising:
receiving a downlink (DL) control message using a shared radio frequency spectrum band;
identifying downlink control information (DCI) of the DL control message;
identifying a control channel type of the DL control message from a plurality of control channel types, the plurality of control channel types comprising a first control channel type and a second control channel type;
determining a function of the DL control message based at least in part on the DCI, wherein the function of the DL control message comprises at least one of an uplink transmission trigger or a frame structure indication;
determining an uplink (UL) transmission based at least in part on the function of the DL control message;
determining a starting time for the determined UL transmission based at least in part on the control channel type being of the first control channel type or the second control channel type, wherein the first control channel type corresponds to the starting time being a first starting time at a first time resource and the second control channel type corresponds to the starting time being a second starting time at a second time resource; and
transmitting the UL transmission starting at the determined starting time.

2. The method of claim 1, further comprising:
determining a time period for the UL transmission based at least in part on one or both of a user equipment (UE) capability and the control channel type being of the first control channel type or the second control channel type, wherein the first control channel type corresponds to the time period being a first time period of a first set of time resources and the second control channel type corresponds to the time period being a second time period of a second set of time resources.

3. The method of claim 2, further comprising:
transmitting the UL transmission during the time period, wherein the UL transmission comprises at least one of a physical uplink control channel (PUCCH) message, a short PUCCH (sPUCCH) message, an enhanced PUCCH (ePUCCH) message, an acknowledgement (ACK) message corresponding to a previous DL transmission, or a physical uplink shared channel (PUSCH) message.

4. The method of claim 1, further comprising:
receiving a grant for a physical uplink shared channel (PUSCH) transmission before receiving the DL control message.

5. The method of claim 1, further comprising:
receiving a cross-transmission opportunity (TxOP) grant, wherein the function of the DL control message is a cross-TxOP grant trigger and the cross-TxOP grant is received before the cross-TxOP grant trigger; and
transmitting the UL transmission in response to the cross-TxOP grant and the cross-TxOP grant trigger.

6. The method of claim 5, further comprising:
receiving a cross-TxOP configuration indicating a location of the cross-TxOP grant trigger.

7. The method of claim 5, wherein the cross-TxOP grant trigger comprises a single bit of the DL control message.

8. The method of claim 5, wherein the cross-TxOP grant trigger comprises a plurality of bits of the DL control message corresponding to a plurality of cross-TxOP grants.

9. The method of claim 1, wherein the DL control message is a common physical downlink control channel (C-PDCCH).

10. The method of claim 1, wherein the at least one of the uplink transmission trigger or the frame structure indication comprises at least one of a short physical uplink control channel (sPUCCH) trigger, an enhanced PUCCH (ePUCCH) trigger, or a cross-transmission opportunity (TxOP) grant trigger.

11. A method of wireless communication, comprising:
configuring a function of a downlink (DL) control message, wherein the function of the DL control message comprises at least one of an uplink transmission trigger or a frame structure indication;
selecting downlink control information (DCI) of the DL control message based at least in part on the function of the DL control message;
identifying a control channel type of the DL control message from a plurality of control channel types, the plurality of control channel types comprising a first control channel type and a second control channel type;

determining a starting time for an uplink (UL) transmission based at least in part on the control channel type being of the first control channel type or the second control channel type, wherein the first control channel type corresponds to the starting time being a first starting time at a first time resource and the second control channel type corresponds to the starting time being a second starting time at a second time resource;
transmitting the DL control message using a shared radio frequency spectrum band; and
receiving the UL transmission starting at the determined starting time, the UL transmission based at least in part on the DCI.

12. The method of claim 11, further comprising:
determining a time period for the UL transmission based at least in part on one or both of a user equipment (UE) capability and the control channel type being of the first control channel type or the second control channel type, wherein the first control channel type corresponds to the time period being a first time period of a first set of time resources and the second control channel type corresponds to the time period being a second time period of a second set of time resources.

13. The method of claim 12, further comprising:
receiving the UL transmission during the time period, wherein the UL transmission comprises at least one of a physical uplink control channel (PUCCH) message, a short PUCCH (sPUCCH) message, an enhanced PUCCH (ePUCCH) message, an acknowledgement (ACK) message corresponding to a previous DL transmission, or a physical uplink shared channel (PUSCH) message.

14. The method of claim 11, further comprising:
transmitting a grant for a physical uplink shared channel (PUSCH) transmission before transmitting the DL control message.

15. The method of claim 11, further comprising:
transmitting a cross-transmission opportunity (TxOP) grant, wherein the function of the DL control message is a cross-TxOP grant trigger and the cross-TxOP grant is transmitted before the cross-TxOP grant trigger; and
receiving the UL transmission in response to the cross-TxOP grant and the cross-TxOP grant trigger.

16. The method of claim 15, further comprising:
transmitting a cross-TxOP configuration indicating a location of the cross-TxOP grant trigger.

17. The method of claim 15, wherein the cross-TxOP grant trigger comprises a single bit of the DL control message.

18. The method of claim 15, wherein the cross-TxOP grant trigger comprises a plurality of bits of the DL control message corresponding to a plurality of cross-TxOP grants.

19. The method of claim 11, wherein the DL control message is a common physical downlink control channel (C-PDCCH).

20. The method of claim 11, wherein the at least one of the uplink transmission trigger or the frame structure indication comprises at least one of a short physical uplink control channel (sPUCCH) trigger, an enhanced PUCCH (ePUCCH) trigger, or a cross-transmission opportunity (TxOP) grant trigger.

21. An apparatus for wireless communication, comprising:
a processor;
memory coupled to the processor; and
instructions stored in the memory and operable, when executed by the processor, to cause the apparatus to:
receive a downlink (DL) control message using a shared radio frequency spectrum band;
identify downlink control information (DCI) of the DL control message;
identify a control channel type of the DL control message from a plurality of control channel types, the plurality of control channel types comprising a first control channel type and a second control channel type;
determine a function of the DL control message based at least in part on the DCI, wherein the function of the DL control message comprises at least one of an uplink transmission trigger or a frame structure indication;
determine an uplink (UL) transmission based at least in part on the function of the DL control message
determine a starting time for the determined UL transmission based at least in part on the control channel type being of the first control channel type or the second control channel type, wherein the first control channel type corresponds to the starting time being a first starting time at a first time resource and the second control channel type corresponds to the starting time being a second starting time at a second time resource; and
transmit the UL transmission starting at the determined starting time.

22. The apparatus of claim 21, wherein the instructions are operable to cause the apparatus to:
determine a time period for the UL transmission based at least in part on one or both of a user equipment (UE) capability and the control channel type being of the first control channel type or the second control channel type, wherein the first control channel type corresponds to the time period being a first time period of a first set of time resources and the second control channel type corresponds to the time period being a second time period of a second set of time resources.

23. The apparatus of claim 22, wherein the instructions are operable to cause the apparatus to:
transmit the UL transmission during the time period, wherein the UL transmission comprises at least one of a physical uplink control channel (PUCCH) message, a short PUCCH (sPUCCH) message, an enhanced PUCCH (ePUCCH) message, an acknowledgement (ACK) message corresponding to a previous DL transmission, or a physical uplink shared channel (PUSCH) message.

24. The apparatus of claim 21, wherein the instructions are operable to cause the apparatus to:
receive a cross-transmission opportunity (TxOP) grant, wherein the function of the DL control message is a cross-TxOP grant trigger and the cross-TxOP grant is received before the cross-TxOP grant trigger; and
transmit the UL transmission in response to the cross-TxOP grant and the cross-TxOP grant trigger.

25. An apparatus for wireless communication, comprising:
a processor;
memory coupled to the processor; and
instructions stored in the memory and operable, when executed by the processor, to cause the apparatus to:
configure a function of a downlink (DL) control message, wherein the function of the DL control message comprises at least one of an uplink transmission trigger or a frame structure indication;

select downlink control information (DCI) of the DL control message based at least in part on the function of the DL control message;
identify a control channel type of the DL control message from a plurality of control channel types, the plurality of control channel types comprising a first control channel type and a second control channel type;
determine a starting time for an uplink (UL) transmission based at least in part on the control channel type being of the first control channel type or the second control channel type, wherein the first control channel type corresponds to the starting time being a first starting time at a first time resource and the second control channel type corresponds to the starting time being a second starting time at a second time resource;
transmit the DL control message using a shared radio frequency spectrum band, and
receive the UL transmission starting at the determined starting time, the UL transmission based at least in part on the DCI.

26. The apparatus of claim 25, wherein the instructions are operable to cause the apparatus to:
determine a time period for the UL transmission based at least in part on one or both of a user equipment (UE) capability and the control channel type being of the first control channel type or the second control channel type, wherein the first control channel type corresponds to the time period being a first time period of a first set of time resources and the second control channel type corresponds to the time period being a second time period of a second set of time resources.

27. The apparatus of claim 26, wherein the instructions are operable to cause the apparatus to:
receive the UL transmission during the time period, wherein the UL transmission comprises at least one of a physical uplink control channel (PUCCH) message, a short PUCCH (sPUCCH) message, an enhanced PUCCH (ePUCCH) message, an acknowledgement (ACK) message corresponding to a previous DL transmission, or a physical uplink shared channel (PUSCH) message.

28. The apparatus of claim 25, wherein the instructions are operable to cause the apparatus to:
transmit a cross-transmission opportunity (TxOP) grant, wherein the function of the DL control message is a cross-TxOP grant trigger and the cross-TxOP grant is transmitted before the cross-TxOP grant trigger; and
receive the UL transmission in response to the cross-TxOP grant and the cross-TxOP grant trigger.

* * * * *